United States Patent
Martin

(10) Patent No.: US 11,632,959 B2
(45) Date of Patent: *Apr. 25, 2023

(54) IN SITU TREATMENT OF SEED IN FURROW

(71) Applicant: FMC Corporation, Philadelphia, PA (US)

(72) Inventor: Timothy M. Martin, Ringoes, NJ (US)

(73) Assignee: FMC Corporation, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,770

(22) Filed: Dec. 8, 2016

(65) Prior Publication Data

US 2017/0181433 A1 Jun. 29, 2017

Related U.S. Application Data

(60) Provisional application No. 62/387,263, filed on Dec. 23, 2015.

(51) Int. Cl.
| | |
|---|---|
| *A01N 63/22* | (2020.01) |
| *A01N 53/00* | (2006.01) |
| *A01N 25/00* | (2006.01) |
| *A01C 7/06* | (2006.01) |
| *A01N 25/16* | (2006.01) |
| *A01C 23/02* | (2006.01) |

(52) U.S. Cl.
CPC .............. *A01N 63/22* (2020.01); *A01C 7/06* (2013.01); *A01C 23/023* (2013.01); *A01N 25/00* (2013.01); *A01N 25/16* (2013.01); *A01N 53/00* (2013.01)

(58) Field of Classification Search
None
See application file for complete search history.

(56) References Cited

U.S. PATENT DOCUMENTS

| | | | |
|---|---|---|---|
| 3,165,114 A | 1/1965 | Garrett | |
| 3,879,550 A * | 4/1975 | Berenson | C07D 417/14 514/223.8 |
| 3,922,977 A * | 12/1975 | Lavo | A01C 21/00 111/200 |
| 4,356,934 A * | 11/1982 | Knake | A01C 1/06 111/174 |
| 4,638,926 A | 1/1987 | Brock | |
| 4,836,939 A | 6/1989 | Hendrickson | |
| 4,975,425 A | 12/1990 | Barnett, Jr. | |
| 5,308,827 A | 5/1994 | Sakamoto | |
| 5,460,106 A * | 10/1995 | Crockett | A01B 17/00 111/120 |
| 5,527,760 A | 6/1996 | Rensing et al. | |
| 5,816,502 A | 10/1998 | Sperry et al. | |
| 5,834,006 A | 11/1998 | Smith et al. | |
| 5,881,493 A | 3/1999 | Restive | |
| 6,071,858 A * | 6/2000 | Modrcin | A01N 43/82 504/134 |
| 6,155,185 A | 12/2000 | Memory et al. | |
| 6,180,088 B1 | 1/2001 | Ohtsubo et al. | |
| 6,214,771 B1 * | 4/2001 | Dexter | A01N 25/06 504/360 |
| 6,289,829 B1 * | 9/2001 | Fish | A01C 5/064 111/121 |
| 6,651,908 B1 | 11/2003 | Borglum et al. | |
| 6,755,400 B2 | 6/2004 | Howe | |
| 6,990,911 B2 * | 1/2006 | Schneider | A01C 7/06 111/118 |
| 7,022,651 B1 | 4/2006 | Lightcap, Jr. et al. | |
| 7,247,647 B2 | 7/2007 | Hughes et al. | |
| 7,370,589 B2 | 5/2008 | Wilkerson et al. | |
| 7,514,428 B2 | 4/2009 | Doller et al. | |
| 8,029,827 B2 | 10/2011 | Martin | |
| 2002/0043197 A1 | 4/2002 | Schaffert | |
| 2004/0071653 A1 | 4/2004 | Bratescu et al. | |
| 2004/0231575 A1 | 11/2004 | Wilkerson et al. | |
| 2005/0215433 A1 | 9/2005 | Benitez et al. | |
| 2006/0166898 A1 | 7/2006 | Chen | |
| 2006/0178271 A1 | 8/2006 | Lynch et al. | |
| 2007/0020304 A1 | 1/2007 | Tamarkin et al. | |
| 2008/0206361 A1 * | 8/2008 | Martin | A01N 53/00 424/683 |
| 2010/0016160 A1 | 1/2010 | Bettarini et al. | |
| 2010/0016163 A1 | 1/2010 | Keiper et al. | |
| 2010/0140368 A1 * | 6/2010 | de Lame | A01N 65/00 239/1 |
| 2010/0163163 A1 | 7/2010 | Kawarabata et al. | |
| 2010/0179198 A1 | 7/2010 | Mertoglu et al. | |
| 2010/0184599 A1 | 7/2010 | Parrish et al. | |
| 2010/0204283 A1 | 8/2010 | Dairiki et al. | |
| 2010/0260873 A1 | 10/2010 | Lindner et al. | |
| 2010/0323897 A1 | 12/2010 | Burke | |
| 2011/0070278 A1 | 3/2011 | Lopez | |
| 2012/0087987 A1 | 4/2012 | Man et al. | |
| 2012/0115728 A1 * | 5/2012 | Su | A01N 35/06 504/348 |
| 2012/0142533 A1 | 6/2012 | Richard et al. | |
| 2012/0149570 A1 | 6/2012 | Burke et al. | |
| 2012/0283103 A1 | 11/2012 | Groenewegen et al. | |
| 2013/0123104 A1 | 5/2013 | McKnight et al. | |
| 2013/0236522 A1 | 9/2013 | Misumi | |
| 2015/0093426 A1 * | 4/2015 | Martin | A01N 25/16 424/408 |
| 2015/0272124 A1 * | 10/2015 | Pedersen | A01N 33/12 514/635 |

FOREIGN PATENT DOCUMENTS

| | | |
|---|---|---|
| CN | 1871913 A | 12/2006 |
| CN | 101179928 A | 5/2008 |

(Continued)

OTHER PUBLICATIONS

English Machine Translation of Takada JP 2013014573 [online], Espacenet, [retrieved on May 8, 2018], Retrieved from the internet: <www.espacenet.com>.*

(Continued)

*Primary Examiner* — Katherine Peebles
(74) *Attorney, Agent, or Firm* — Armstrong Teasdale LLP

(57) ABSTRACT

Methods, systems, and kits are provided for in situ seed treatment with liquid crop benefit compositions at planting in furrow.

12 Claims, 12 Drawing Sheets

(56) References Cited

FOREIGN PATENT DOCUMENTS

| | | | |
|---|---|---|---|
| CN | 101179938 A | 5/2008 | |
| CN | 101677527 A | 3/2010 | |
| CN | 102458126 A | 5/2012 | |
| CN | 102595881 A | 7/2012 | |
| CN | 102666477 A | 9/2012 | |
| EP | 0400914 A1 | 12/1990 | |
| EP | 0488668 A1 | 6/1992 | |
| EP | 1449914 A1 | 8/2004 | |
| GB | 1462560 | 1/1977 | |
| JP | H03-63201 A | 3/1991 | |
| JP | H04-305502 A | 10/1992 | |
| JP | H05-000904 A | 1/1993 | |
| JP | H06-508997 A | 10/1994 | |
| JP | H08-225414 A | 9/1996 | |
| JP | 2004-195329 A | 7/2004 | |
| JP | 2008-074659 A | 4/2008 | |
| JP | 2008127366 A | 6/2008 | |
| JP | 2008-531470 A | 8/2008 | |
| JP | 2008-533190 A | 8/2008 | |
| JP | 2009-521477 A | 6/2009 | |
| JP | 2010-083797 A | 4/2010 | |
| JP | 2012-525413 A | 10/2012 | |
| JP | 2013014573 * | 1/2013 | |
| JP | 2013-513663 A | 4/2013 | |
| KR | 2012-0060780 A | 6/2012 | |
| RU | 20116016 C1 | 7/1998 | |
| RU | 2533900 C2 | 11/2014 | |
| SU | 858601 A1 | 8/1981 | |
| UA | 1985 A | 12/1997 | |
| WO | 1985/01876 A1 | 5/1985 | |
| WO | 198501876 | 5/1985 | |
| WO | 96/016543 A2 | 6/1996 | |
| WO | 199816106 A1 | 4/1998 | |
| WO | 01/76352 A1 | 10/2001 | |
| WO | 2001/076352 | 10/2001 | |
| WO | 200189503 | 11/2001 | |
| WO | 2006124508 A1 | 5/2006 | |
| WO | 2006/066361 A1 | 6/2006 | |
| WO | 2006/100227 A1 | 9/2006 | |
| WO | 2006128707 A1 | 12/2006 | |
| WO | 2007085899 A2 | 8/2007 | |
| WO | 2010129345 | 11/2010 | |
| WO | 2011025789 A2 | 3/2011 | |
| WO | 2011080208 A1 | 7/2011 | |
| WO | 2012/035015 A2 | 3/2012 | |
| WO | 2013/043262 A2 | 3/2013 | |
| WO | 2013041975 A2 | 3/2013 | |
| WO | 2013/087430 A1 | 6/2013 | |
| WO | 2013087430 A1 | 6/2013 | |
| WO | 2013/135605 A1 | 9/2013 | |
| WO | 2014/079813 A1 | 5/2014 | |
| WO | WO-2014079813 A1 * | 5/2014 | ............ A01N 43/42 |
| WO | 2014/118573 A1 | 8/2014 | |
| WO | 2010117740 | 10/2014 | |
| WO | 2015/048757 A2 | 4/2015 | |
| WO | 2015/200428 A | 12/2015 | |
| WO | 2016/209217 A1 | 12/2016 | |

OTHER PUBLICATIONS

Partial International Search Report dated Feb. 13, 2017 in International Patent Application No. PCT/US16/065564 (2 pages).
FMC Bifenthrin MSDS, http://www.fluoridealert.org/wp-content/pesticides/msds/bifenthrin.technical.pdf. Accessed 2017.
Stepan company, NINEX® MT630F, http://www.stepan.com/products/Surfactants/NINEX%C2%AEMT630F.aspx, Accessed 2017.
Notification of Transmittal of International Preliminary Report on Patentability dated Dec. 4, 2017 (7 pages).
Invitation to Pay Additional Fees (including partial International Search Report) dated Dec. 17, 2014 in connection with International Patent Application No. PCT/US2014/058340 (6 pages).
Third Party Observation submitted Mar. 30, 2016 relating to International Patent Application No. PCT/US2014/068571 (5 pages).
International Search Report and Written Opinion issued in connection with International Application No. PCT/US2015/037327 dated Sep. 2, 2015 (14 pages).
Zaoxiang Wang, "Pesticide processing series, pesticide auxiliaries", Chemical Industry Publishing, 1994, pp. 674-680, English abstract.
"[Insecticide Application] Insecticidal Foams Require Knowledge and Precision", Robinson, PCT Magazine, Jun. 29, 2012; https://www.pctonline.com/article/PCT-insecticides-water-based-foam/.
"Targeted Delivery of Pesticides Using Biodegradable Polymeric Nanoparticles", De et al., Jan. 2014, DOI: 10.1007/978-81-322-1689-6; ISBN: 978-81-322-1688-9; https://link.springer.eom/book/10.1007/978-81-322-1689-6.
Eurasian Office Action dated Apr. 22, 2021, in related Eurasian Application No. 201990233, 4 pages.
Korean Office Action dated May 7, 2021 in related Korean Patent Application No. 2016-7011285. 10 pages.
Material Safety Data Sheet; MSD Bio-Soft D-40 Sodium dodecylbezene sulfonate Product Code: 0458, Version # 23, Revision Date: Jan. 18, 2010 Stepan Company, www.stepan.com.
Stepan Product Selector Guide Household Institutional and Industrial Cleaning, Bio-Terge AS-40 and Sodium C14-C16 olefin sulfonate www.stepan.com, Version Nov. 2015.
ACID/ALKALI Solubility for HI & I Cleaning, Ammonyx DO decylamine oxide, Stepan Product Company, www.stepan.com, Version Jul. 2014.
AMMONYX LO Special Stepan Product Bulletin, CAS Reg. No. 1643-20-5, Stepan Company, www.stepan.com May 2010.
STEOL-CA-330 Ammonium Laureth Sulfate Stepan Product Bulletin, CAS Reg. No. 32612-48-9, Stepan Company; www.stepan.com, Apr. 2010 Stepan Company, www.stepan.com.
Global Product Portfolio Cedepal TD-407 (Sodium trideceth sulfate) and Polystep B-25 (Sodium decyl sulfate), Stepan Company, www.stepan.com May 2011v3.
Colombian Office Action dated Apr. 23, 2021 in related to International Application No. PCT/US2016/065564. 19 pages.

* cited by examiner

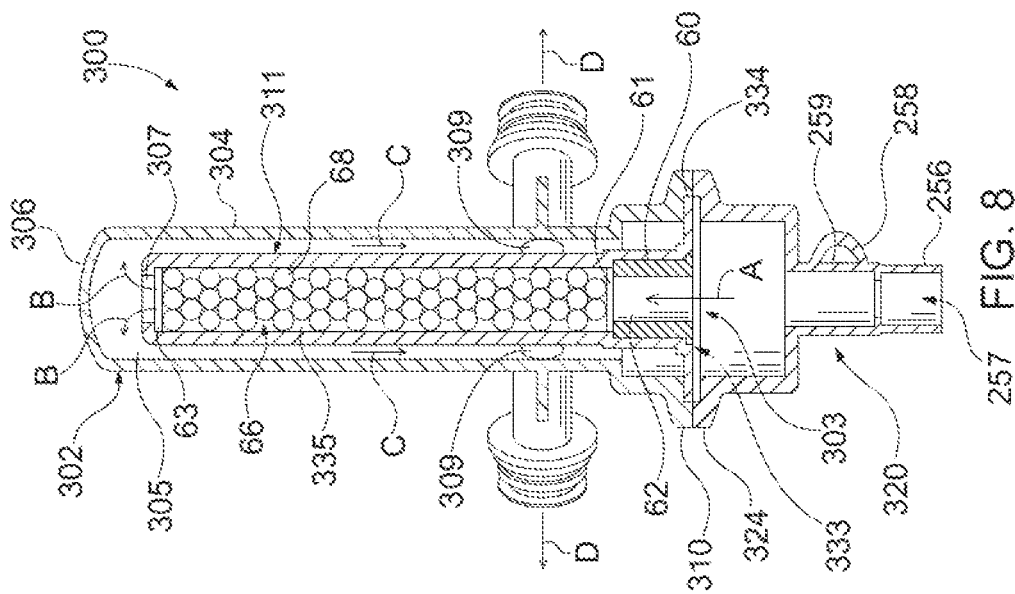
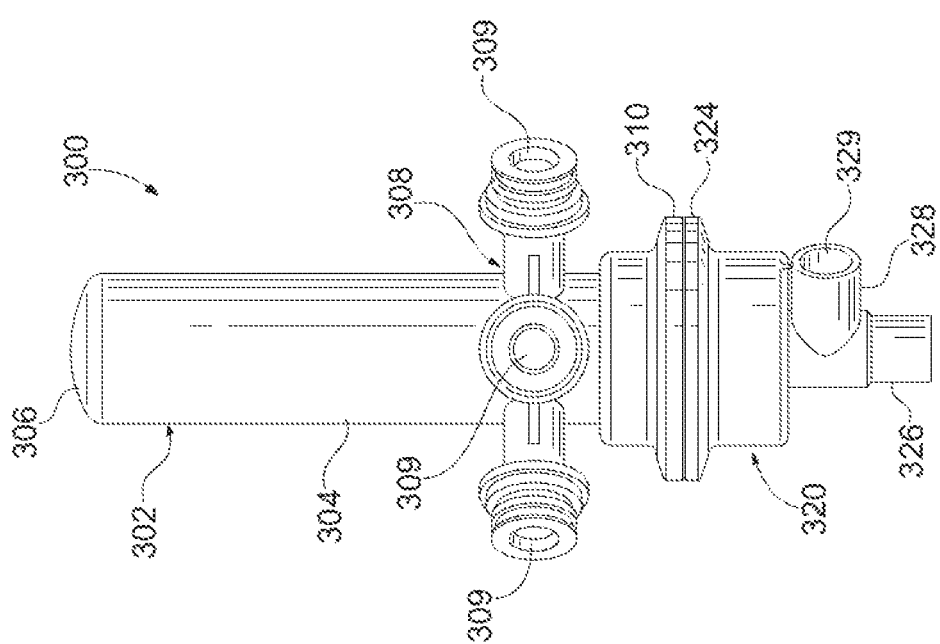

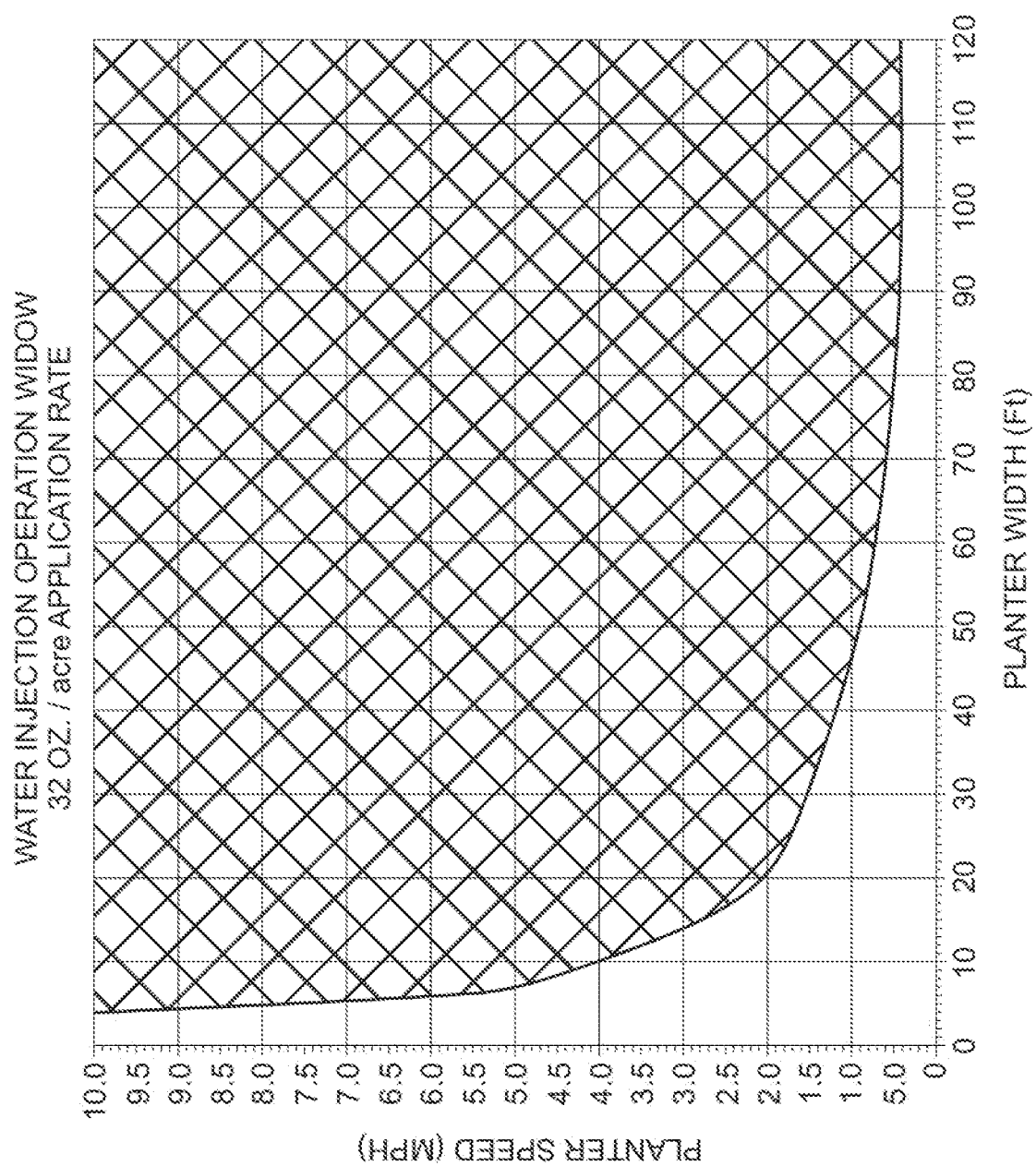

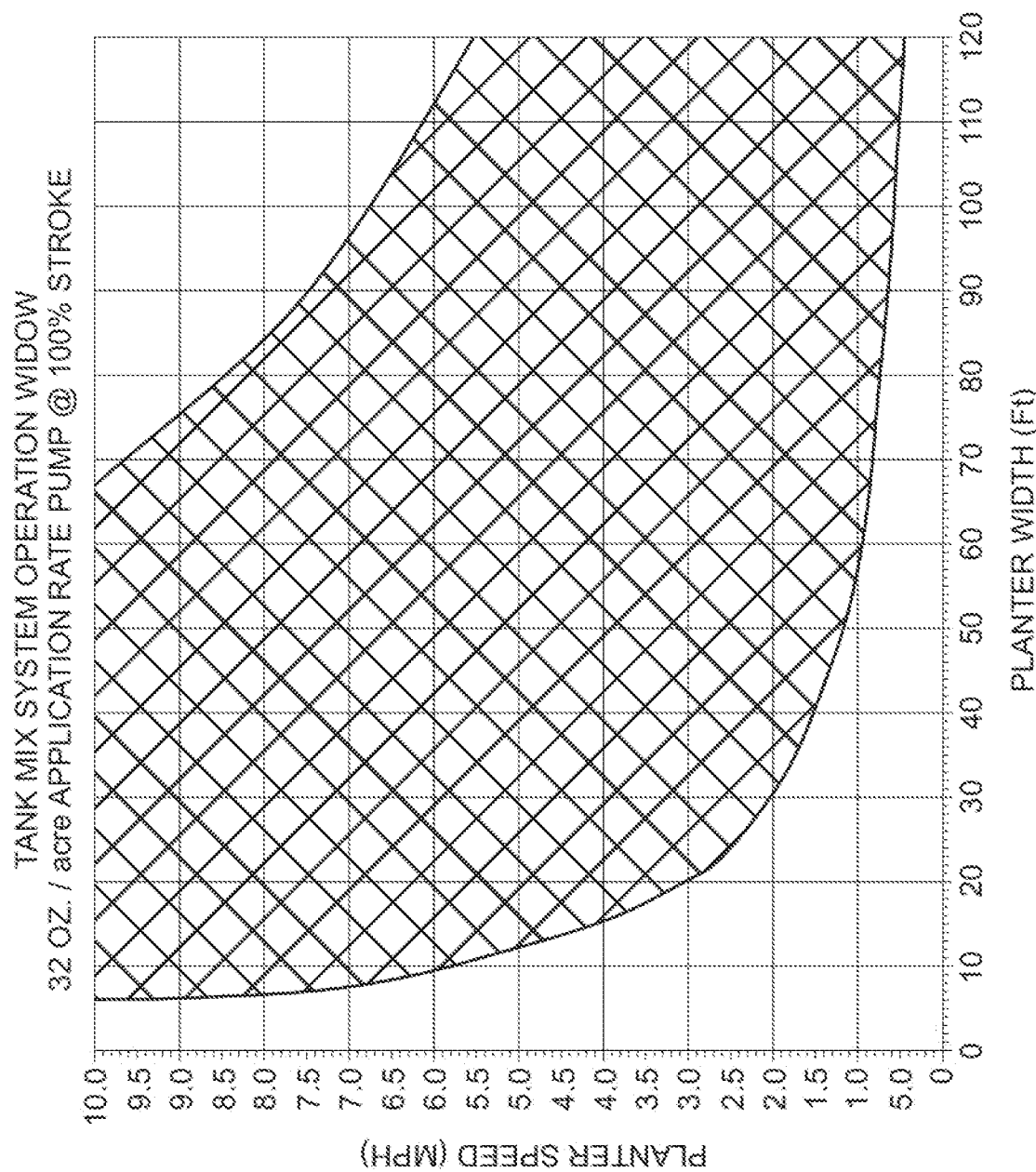

IN SITU TREATMENT OF SEED IN FURROW

CROSS-REFERENCE TO RELATED APPLICATION

This application is a non-provisional of and claim priority to U.S. provisional patent application Ser. No. 62/387,263 filed Dec. 23, 2015, which is hereby incorporated by reference in its entirety.

FIELD OF THE DISCLOSED SUBJECT MATTER

The present invention relates, in certain aspects, to the field of liquid crop benefit compositions and formulations, as well as the apparatus, kits, systems and methods for applying such compositions and formulations to seed at plant.

BACKGROUND OF THE INVENTION

Many growers do not apply starter fertilizer, insecticide, or other beneficial agricultural treatments at the time of planting because of the amount of additional transportation, handling, and labor required for such application.

Applying active ingredients to a large field requires the transport of large volumes of water. The water is commonly carried by a tractor, which has a limited capacity.

Additionally, in some regions water in large quantities is unavailable. Many agricultural actives are applied to crops or soil as broadcast sprays, which are vulnerable to spray drift and cannot be applied precisely, frequently resulting in off-target effects including toxicity to non-target species. The active ingredient is typically added to a tank and mixed with a diluent such as water before being sprayed on the field or crop. The active ingredient may be in one of many known formulation types, for example, an emulsion concentrate (EC), a water-dispersible granule (WG), a microencapsulate, a capsule suspension (CS), or a suspension concentrate (SC). After dilution, using currently-known formulations and techniques, a typical application volume can range from approximately 3-25 gallons/acre. Application to 500 acres at a typical rate thus requires 1500-12,500 gallons of liquid.

A tractor or other mechanical planting equipment carrying a full load of seeds or other plant-generative material cannot accommodate such a high volume of liquid, so fertilizer, insecticide, or other treatment at time of planting requires multiple trips to refill the tractor's tanks. Rather than make these trips, most growers prefer to load seed once and plant uninterrupted all day long. Although this saves valuable planting time, it prevents a grower from applying fertilizer, insecticide, or other beneficial agricultural treatments at the time of planting. Application of treatment post-planting requires additional costs in terms of time, fuel and equipment. It would be beneficial if a grower could load both the seed and the fertilizer, insecticide, or other beneficial treatments once and plant uninterrupted while applying a planting-time treatment.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

One aspect of the invention is directed to a method for the in situ treatment of a seed being planted in a furrow, comprising directly applying a liquid formulation to a furrow immediately before, during or immediately after planting a seed in the furrow, in an amount sufficient to provide at least one crop benefit effect, where the liquid formulation comprises at least one agriculturally active ingredient. In one embodiment the formulation is delivered into the furrow in a continuous manner. In another embodiment the formulation is delivered into the furrow in a discontinuous manner immediately before, during, or immediately after planting the seed in the furrow, where the formulation is applied directly to the seed and, in embodiments, to an area immediately surrounding the location where the seed is planted. In one embodiment the method further comprises the step of covering the planted seed in the furrow with soil immediately after the formulation is applied. In another embodiment the agriculturally active ingredient is selected from the group consisting of pesticides, insecticides, fungicides, herbicides, nematicides, fertilizers, plant growth regulators, biological agents, and combinations of two or more thereof. In one embodiment of the method the agriculturally active ingredient is a biological agent. In another embodiment of the method the active ingredient is selected from the group consisting of neonicotinoid insecticides, bifenthrin, biofungicides, and combinations of two or more thereof. In one embodiment of the method the liquid formulation is foamed and applied to the furrow in the form of a stable foam rope.

In one embodiment of the method the formulation is an aqueous composition in the form of a microemulsion, an oil-in-water concentrated emulsion, a suspension, a suspension concentrate, an emulsifiable concentrate, or a microencapsulate that further comprises one or more additives selected from the group consisting of stabilizers, dispersants, surfactants, wetting agents, preservatives, adjuvants, biocides and lubricants.

In one embodiment of the method the formulation comprises a foamable aqueous composition comprising at least one foaming agent and at least one foam stabilizer. In another embodiment the agriculturally active ingredient is selected from the group consisting of pesticides, insecticides, fungicides, herbicides, nematicides, fertilizers, plant growth regulators, biological agents, and combinations of two or more thereof. In one embodiment the foamable aqueous composition further comprises a gas to produce a foamed agricultural formulation. In one embodiment of the foamable aqueous composition at least one foaming agent is present in the formulation in an amount of about 5% to about 25% by weight of the formulation. In one embodiment of the method a foamed agricultural formulation is applied to the planted seed at an effective rate of about 1 gallon/acre or less, preferably about 0.5 gallon/acre or less, more preferably about 0.3 gallon/acre or less.

An additional aspect of the invention is directed to a crop-protective system for providing at least one crop benefit treatment in a crop growing environment, comprising applying to a furrow immediately before, during or immediately after planting a seed in the furrow a liquid formulation comprising at least one agriculturally active ingredient, where the formulation is applied in an amount sufficient to produce at least one crop benefit effect to the seed. In one embodiment the agriculturally active ingredient is selected from the group consisting of pesticides, insecticides, fungicides, herbicides, nematicides, fertilizers, plant growth regulators, biological agents, and combinations of two or more thereof. In one embodiment of the system the liquid formulation is foamed and applied to a furrow in the form of a stable foam rope.

Another additional aspect of the invention is directed to a system for in situ benefit of seeds, comprising a) a liquid plant benefit formulation, and b) an application means for applying an effective amount of the liquid formulation to a furrow while planting a seed in the furrow; where the application means applies the formulation to the furrow immediately before, during or immediately after planting the seed in the furrow. In one embodiment the treated planted seed is covered with soil in the same operation. In another embodiment the agriculturally active ingredient is selected from the group consisting of pesticides, insecticides, fungicides, herbicides, nematicides, fertilizers, plant growth regulators, biological agents, and combinations of two or more thereof. In one embodiment of the system the application means applies a foamed liquid formulation to a furrow in the form of a stable foam rope.

A further additional aspect of the invention is directed to a method for in situ benefit to seeds during planting, comprising the steps of a) applying an effective amount of a liquid plant benefit formulation to a furrow while planting in a seed in the furrow, and b) covering the treated seed in the furrow with soil in the same operation; where the liquid formulation is applied to the furrow immediately before, during or immediately after planting a seed in the furrow. In one embodiment the agriculturally active ingredient is selected from the group consisting of pesticides, insecticides, fungicides, herbicides, nematicides, fertilizers, plant growth regulators, biological agents, and combinations of two or more thereof. In one embodiment the liquid formulation is foamed and applied in the form of a foam rope.

One aspect of the invention is directed to a method for the in situ treatment of a seed being planted in a furrow, comprising directly applying a liquid formulation to a seed during or immediately after planting a seed in a furrow, in an amount sufficient to provide at least one crop benefit effect, where the liquid formulation comprises at least one agriculturally active ingredient. In one embodiment the agriculturally active ingredient is selected from the group consisting of pesticides, insecticides, fungicides, herbicides, nematicides, fertilizers, plant growth regulators, biological agents, and combinations of two or more thereof. In one embodiment the formulation is delivered into the furrow in a continuous manner. In another embodiment the formulation is delivered into the furrow in a discontinuous manner immediately before, during, or immediately after planting the seed in the furrow, where the formulation is applied directly to the seed and, in embodiments, to an area immediately surrounding the location where the seed is planted; the formulation can be foamed and applied in the form of a foam rope. In one embodiment the method further comprises the step of covering the treated seed in the furrow with soil immediately after the formulation is applied. In one embodiment of the method the liquid formulation is foamed and applied to the furrow in the form of a stable foam rope. In one embodiment of the method the liquid formulation is foamed and applied to a seed in the form of a stable foam rope.

Another aspect of the invention is directed to a system for in situ treatment of a seed with a liquid formulation comprising at least one agriculturally active ingredient during release of a seed from a mechanical planter into a furrow, the system comprising a reservoir containing the formulation, and coupled to a sprayer or other applicator; a seed chamber; at least one conduit coupling the sprayer/applicator associated with the reservoir to the seed chamber; where the seed is released from the seed chamber into the conduit and then treated with the formulation by the applicator as the seed passes into the furrow. In one embodiment of the system the agriculturally active ingredient is selected from the group consisting of pesticides, insecticides, fungicides, herbicides, nematicides, fertilizers, plant growth regulators, biological agents, and combinations of two or more thereof. In an embodiment of the system the agriculturally active ingredient is a biological agent. In another embodiment the active ingredient is selected from the group consisting of neonicotinoid insecticides, bifenthrin, biofungicides, and combinations of two or more thereof. In one embodiment of the system the liquid formulation is foamed and applied to the seed by the applicator in the form of a stable foam rope as it passes into the furrow.

Yet another aspect of the invention is directed to a system for in situ treatment of a seed with a liquid formulation comprising at least one agriculturally active ingredient, after release of the seed from a mechanical planter into a furrow, comprising a reservoir containing the liquid formulation, and coupled to a sprayer or other applicator; a seed chamber; and at least one conduit coupled to the seed chamber; where a seed from the seed chamber is treated with the formulation by the applicator immediately after it has been deposited into the furrow. In one embodiment of the system the agriculturally active ingredient is selected from the group consisting of pesticides, insecticides, fungicides, herbicides, nematicides, fertilizers, plant growth regulators, biological agents, and combinations of two or more thereof. In an embodiment the agriculturally active ingredient is a biological agent. In another embodiment the active ingredient is selected from the group consisting of neonicotinoid insecticides, bifenthrin, biofungicides, and combinations of two or more thereof. In one embodiment of the system the liquid formulation is foamed and applied to the seed by the applicator in the form of a stable foam rope after it has been deposited into the furrow.

Still another aspect of the invention is directed to a system for dispensing a foamable liquid agricultural formulation, comprising a mechanical planter capable of dispensing the formulation as a foam, comprising a foam mixing chamber configured to receive a foamable formulation (also known as an expanding formulation), and a compressible fluid carrier, the foamable formulation comprising at least one agriculturally active ingredient, at least one foaming agent, and at least one foam stabilizer; a foaming medium positioned within the foam mixing chamber such that the compressed fluid drives the formulation through the foaming medium to a foam outlet; at least one conduit associated with the foam outlet, the conduit configured to deliver foamed formulation created in the foam mixing chamber to a delivery nozzle, dispensing orifice or other outlet; and the dispensing orifice further directed to a furrow; where delivery of the foamed formulation into the furrow during or after a seed is planted in the furrow provides an amount of foam sufficient to produce at least one crop benefit effect to the seed. In one embodiment the agriculturally active ingredient is selected from the group consisting of pesticides, insecticides, fungicides, herbicides, nematicides, fertilizers, plant growth regulators, biological agents, and combinations of two or more thereof. In one embodiment the foamed formulation is delivered into the furrow in a continuous manner. In another embodiment the foamed formulation is delivered into the furrow after the seed has been planted in the furrow, in a discontinuous manner, whereby the foamed formulation is applied directly to the seed and, optionally, to an area immediately surrounding the seed. In one embodiment of the system an effective amount of the foamed formulation is delivered into the furrow at an effective rate of about 1 gallon/acre or less, preferably about 0.5 gallon/acre or less, more preferably about 0.3 gallon/acre or less. In one embodiment of the system the agriculturally active ingredient is present in the liquid agricultural formulation in the form of a suspension concentrate that is stable over a time period of about 1-2 years. In one embodiment the agriculturally active ingredient is a biological agent. In one embodiment the foamable formulation has a viscosity of at least 10 cps and is delivered to the furrow as a foamed formulation at a rate of about 0.75 lbs a.i./acre. In one embodiment of the system the foamed formulation has an expansion factor of at least about 25. In another embodiment the foamed formulation has an expansion factor of up to about 50 or greater. In one embodiment of the system the foamed formulation delivered into a furrow is in the form of a stable foam rope.

A further embodiment of the invention is directed to a crop-protective system for providing at least one crop benefit treatment in a crop growing environment, comprising applying to a seed, immediately before, during or after planting the seed in a furrow, a liquid formulation comprising at least one agriculturally active ingredient, where the formulation is applied in an amount sufficient to produce at least one crop benefit effect to the seed. In one embodiment the agriculturally active ingredient is selected from the group consisting of pesticides, insecticides, fungicides, herbicides, nematicides, fertilizers, plant growth regulators, biological agents, and combinations of two or more thereof. In one embodiment of the system the formulation is applied in a continuous manner. In another embodiment of the system the formulation is applied in a discontinuous manner, whereby the formulation is applied directly to the seed and, optionally, to an area immediately surrounding the seed. In one embodiment of the system the amount of water in the formulation is from 0% to about 45% by weight based on the total weight of the formulation. In one embodiment the formulation further comprises at least one foaming agent and at least one foam stabilizer. In an embodiment of the system the agriculturally active ingredient is a biological agent. In one embodiment of the system the agriculturally active ingredient is selected from the group consisting of neonicotinoid insecticides, bifenthrin, biofungicides, and combinations of two or more thereof. In one embodiment of the system the liquid formulation is foamed and applied in the form of a stable foam rope.

Another aspect of the invention is directed to a system for in situ benefit of seeds comprising a) a liquid plant benefit formulation, and b) an application means for applying an effective amount of the liquid formulation to a seed while planting in a furrow; where the application means applies the formulation to the seeds during or immediately after planting in the furrow. In one embodiment the agriculturally active ingredient of the liquid plant benefit formulation is selected from the group consisting of pesticides, insecticides, fungicides, herbicides, nematicides, fertilizers, plant growth regulators, biological agents, and combinations of two or more thereof. In one embodiment the treated planted seed is covered with soil in the same operation. In one embodiment of the system the formulation is applied in a continuous manner. In another embodiment the formulation is applied immediately after the seed has been planted in the furrow, in a discontinuous manner, whereby the formulation is applied directly to the seed and, optionally, to an area immediately surrounding the seed. In one embodiment of the system the formulation is applied at an effective rate of about 1 gallon/acre or less, preferably about 0.5 gallon/acre or less, more preferably about 0.3 gallon/acre or less. In one embodiment the agriculturally active ingredient is a biological agent. In one embodiment of the system the liquid formulation is applied in the form of a stable foam rope.

Still another aspect of the invention is directed to a method for in situ benefit of seeds during planting, comprising the steps of a) applying an effective amount of a liquid plant benefit formulation to a seed while planting in a furrow, and b) covering the treated seed in the furrow with soil in the same operation; where the liquid formulation is applied to the seed immediately before, during or immediately after planting in the furrow. In one embodiment the agriculturally active ingredient of the liquid plant benefit formulation is selected from the group consisting of pesticides, insecticides, fungicides, herbicides, nematicides, fertilizers, plant growth regulators, biological agents, and combinations of two or more thereof. In one embodiment of the method the formulation is applied in a continuous manner. In another embodiment the formulation is applied in a discontinuous manner, whereby the formulation is applied directly to the seed and, optionally, to an area immediately surrounding the seed. In one embodiment of the method the formulation is applied at an effective rate of about 1 gallon/acre or less, preferably about 0.5 gallon/acre or less, more preferably about 0.3 gallon/acre or less. In one embodiment of the method the agriculturally active ingredient is a biological agent. In one embodiment of the method the liquid formulation is foamed and applied in the form of a stable foam rope.

Yet another aspect of the invention is directed to a low-volume liquid agricultural formulation, comprising at least one agriculturally active ingredient selected from the group consisting of insecticides, pesticides, fungicides, herbicides, fertilizers, plant growth regulators, plant growth promoters, biological agents, and combinations of two or more thereof; where the low-volume liquid agricultural formulation contains from 0% to about 45% by weight of water, based on the total weight of the liquid agricultural formulation, and where the low-volume liquid agricultural formulation is not a foamable formulation. In one embodiment the low-volume liquid formulation contains from about 1% to about 10% by weight of water. In one embodiment the neonicotinoid insecticide is selected from the group consisting of imidacloprid, thiamethoxam, nitenpyram, acetamiprid, dinotefuran, thiacloprid, and clothianidin. In one embodiment the neonicotinoid insecticide is present in an amount from about 5% to about 40%. In another embodiment of the low-volume liquid agricultural formulation the fungicide is a biofungicide which comprises a biologically pure culture of *Bacillus* sp. D747 strain having properties beneficial to plant growth. In one embodiment the *Bacillus* sp. D747 is deposited as FERM BP-8234. In one embodiment the bacterial strain is in the form of spores or vegetative cells. In one embodiment the biologically pure culture of the *Bacillus* sp. D747 strain deposited as FERM BP-8234 is present in about $7.6 \times 10^9$ CFU/ml to about $1.2 \times 10^{10}$ CFU/ml.

In one embodiment the low-volume liquid agricultural formulation further comprises one or more active ingredients selected from the group consisting of pesticides, insecticides, fungicides, herbicides, nematicides, fertilizers, plant growth regulators, biological agents, and combinations of two or more thereof. In one embodiment the active ingredient comprises both a neonicotinoid and bifenthrin. In another embodiment the active ingredient comprises both bifenthrin and a biofungicide. In some embodiments bifenthrin is present in an amount from about 5% to about 40%. In embodiments, bifenthrin in present in an amount of from about 5% to about 40% by total weight of the formulation. In some embodiments the low-volume liquid agricultural formulation comprises a dispersant and a preservative. In one embodiment the agriculturally active ingredient is present in the form of a suspension concentrate that is stable over a time period of about 1-2 years.

Still another aspect of the invention is directed to a kit for preparing a foamable liquid agricultural formulation comprising a container; a low-volume liquid agricultural formulation comprising a biologically pure culture of *Bacillus* sp. D747 strain and bifenthrin, disposed within the container; and optionally, instructions for delivering the formulation to a seed of a plant in an amount effective to provide at least one crop benefit effect.

Yet another aspect of the invention is directed to a method of reducing the exposure of pollinators and other beneficial insects to pesticides, comprising the steps of a) applying an effective amount of a liquid plant benefit formulation to a seed while planting in a furrow in an agricultural field comprising pollinators and/or other beneficial insects, and b) immediately covering the treated seed in the furrow with soil in the same operation; where the liquid formulation is applied to the seed during or immediately after planting in the furrow. In one embodiment of the method the liquid formulation is foamed and applied to a seed while planting an a furrow, in the form of a stable foam rope.

A further aspect of invention is directed to a method of reducing soil-applied pesticide burden, comprising targeted direct application of a liquid formulation to a seed during or immediately after planting a seed in a furrow, in an amount sufficient to provide at least one crop benefit effect, where the liquid formulation comprises at least one agriculturally active ingredient. In one embodiment of the method the liquid formulation is foamed and applied to a seed in the form of a stable foam rope.

Yet another aspect of invention is directed to a method of dust-free application of pesticides, comprising the steps of a) applying an effective amount of a liquid plant benefit formulation to a seed while planting in a furrow, and b) immediately covering the treated seed in the furrow with soil in the same operation; where the liquid formulation is applied to the seed during or immediately after planting in the furrow, and where the application does not generate pesticide-containing dust. In one embodiment the agriculturally active ingredient of the liquid plant benefit formulation is selected from the group consisting of pesticides, insecticides, fungicides, herbicides, nematicides, fertilizers, plant growth regulators, biological agents, and combinations of two or more thereof. In one embodiment of the method the liquid formulation is foamed and applied to a seed in the form of a stable foam rope.

Still another aspect of invention is directed to a method of in situ custom treatment of a crop seed with a crop benefit composition, comprising directly applying a liquid crop benefit composition to a crop seed during or immediately after planting a crop seed in a furrow in an agricultural field, in an amount sufficient to provide at least one crop benefit effect specific to the needs of the crop in the agricultural field, where the liquid composition comprises at least one agriculturally active ingredient. In one embodiment the agriculturally active ingredient of the liquid plant benefit composition is selected from the group consisting of pesticides, insecticides, fungicides, herbicides, nematicides, fertilizers, plant growth regulators, biological agents, and combinations of two or more thereof. In one embodiment of the method the liquid composition is foamed and applied to a crop seed in the form of a stable foam rope.

Another aspect of invention is directed to a method of enhancing the activity of low soil-mobile crop benefit agents, comprising the step of directly applying a liquid formulation comprising at least one crop benefit agent having low soil-mobility to a seed during or immediately after planting the seed in a furrow, in an amount sufficient to provide at least one crop benefit effect. In one embodiment the crop benefit agent is an agriculturally active ingredient selected from the group consisting of pesticides, insecticides, fungicides, herbicides, nematicides, fertilizers, plant growth regulators, biological agents, and combinations of two or more thereof. In one embodiment of the method the liquid formulation is foamed and applied to a seed in the form of a stable foam rope.

One aspect of invention is directed to a method of enhancing seed benefit, comprising directly applying a liquid crop benefit formulation to a seed during or immediately after planting a seed in a furrow, in an amount sufficient to provide at least one crop benefit effect, where the liquid formulation comprises at least one agriculturally active ingredient. In one embodiment the the crop benefit formulation comprises an agriculturally active ingredient selected from the group consisting of pesticides, insecticides, fungicides, herbicides, nematicides, fertilizers, plant growth regulators, biological agents, and combinations of two or more thereof. In one embodiment of the method the seed is a pre-treated seed. In another embodiment the seed is an untreated seed. In one embodiment of the method the liquid formulation is foamed and applied to a seed in the form of a stable foam rope.

Another aspect of invention is directed to a method for on-demand precision seed treatment, comprising directly applying a liquid formulation to a seed immediately before, during or immediately after planting a seed in a furrow, in an amount sufficient to provide at least one crop benefit effect, where the liquid formulation comprises at least one agriculturally active ingredient. In one embodiment the liquid formulation comprises an agriculturally active ingredient selected from the group consisting of pesticides, insecticides, fungicides, herbicides, nematicides, fertilizers, plant growth regulators, biological agents, and combinations of two or more thereof. In one embodiment of the method the liquid formulation is foamed and applied to a seed in the form of a stable foam rope.

Still another aspect of invention is directed to a system for on-demand precision seed treatment, comprising a) a liquid plant benefit formulation, and b) an application means for targeted application of an effective amount of the liquid formulation to a seed while planting in a furrow; where the application means applies the formulation to the seeds during or immediately after planting in the furrow. In one embodiment the liquid plant benefit formulation comprises and agriculturally active ingredient selected from the group consisting of pesticides, insecticides, fungicides, herbicides, nematicides, fertilizers, plant growth regulators, biological agents, and combinations of two or more thereof. In one embodiment of the system the application means applies a foamed liquid formulation to a seed in the form of a stable foam rope.

The formulations and compositions of the invention, in combination with the methods, kits, apparatus and systems of the invention, are designed to produce and apply a stable foam that gives a stable rope-like appearance in furrow.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 7 is a perspective view of the foam mixing chamber of FIG. 6.

FIG. 8 is a cross-sectional view through the foam mixing chamber of FIG. 6.

FIGS. 13-17 are graphical illustrations of exemplary speeds and planter widths that the present systems can operate within.

DETAILED DESCRIPTION OF EXEMPLARY EMBODIMENTS

Figure 1:
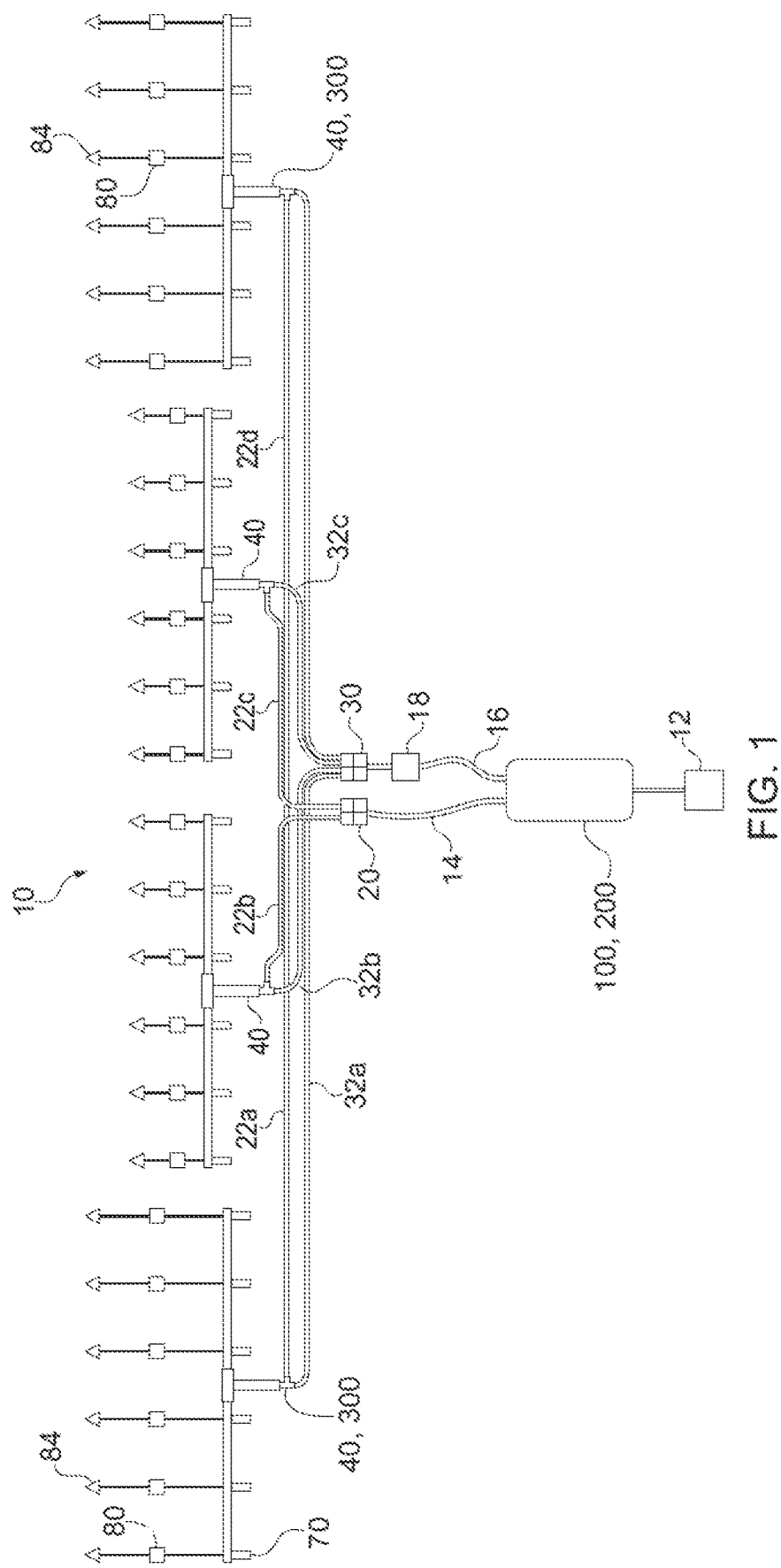
FIG. 1 is a schematic representation of an exemplary delivery system in accordance with an embodiment of the invention.

Reference will now be made in detail to exemplary embodiments of the disclosed subject matter, embodiments of which are illustrated in the accompanying drawings. The method and corresponding steps of the disclosed subject matter will be described in conjunction with the detailed description of the system.

Definitions

The following terms shall have the respective meanings set forth below.

A particle size, $D_{90}$, shall mean that at least about 90% of the particles in the composition are smaller than the given $D_{90}$, as measured by Horiba LA920 particle size analyzer.

"25% Drain Time," or DT25, is a measure of a foam's static stability and is the time required for 25% of a foam's volume to disintegrate.

"Organic solvents" as used herein include cyclic, straight-chain or linear amide solvents; straight-chained or branched hydrocarbons with a chain length from $C_1$ to $C_{18}$. Other suitable solvents that can be named are glycol ether and butyl propylene carbamates.

The term "effective amount" means an amount of a specified agent, composition or formulation that is sufficient to have the specified properties under the specified conditions.

With regard to a seed, the term "planted" can include a seed that is dropped, placed or otherwise deposited in a furrow.

The term "immediately" with regard to the phrases "immediately before planting" and "immediately after planting" denotes that the operation (such as applying a crop benefit composition or formulation to the planted seeds) occurs on the same time scale as "planting" so that the entire planting and seed application process occurs in a single pass in the field. The time scale involved is on the order of seconds, preferably 1 second or less, depending on the speed of the tractor or other mechanical planting equipment. The term "immediately" with regard to the phrase "immediately surrounding the seed" denotes the soil adjacent to the seed, within several inches of the planted seed.

The phrase "effective rate" with regard to a foamed formulation denotes the volume of foamable formulation prior to foaming, which is applied to the seed in furrow.

The term "seed" is understood not only in its traditional meaning of a flowering plant's unit of reproduction, capable of developing into another such plant, but also denotes certain rhizomes (such ginger root), the eye of a potato ("seed potato"), sections of sugarcane stalks ("setts"), and other plant parts capable of developing into another such plant. "Seed" can also include pre-treated or pre-coated seed.

With regard to "seed treatment", the present disclosure is directed to treatment of seed in situ, at planting, as opposed to seed pre-treatment which is commonly practiced in the agricultural and seed industries with pre-coated seeds being commercially available with coatings of specific insecticides, fungicides or other agricultural chemicals.

As used herein, the term "biological agent" refers to a microorganism, such as a bacterium, protozoan or fungus, or other biological vector such as a virus, nucleic acid or protein, that can be used to provide a crop benefit effect. In various embodiments, biological agents may include, without limitation, biofungicides, bioinsecticides, and bionematicides.

As used herein, the term "crop protective effect" or "plant protective effect" refers to an effect on a crop or plant of a molecule or combination of molecules which express biological activity as a pesticide, arthropodicide, insecticide, acaricide, nematicide, fungicide, herbicide, plant growth regulator or a combination of two or more of these biological activities.

As used herein, the term "crop benefit" or "plant benefit" refers to one or more "crop protective effects" or "plant protective effects" and/or one or more other positive effects on crops or plants such as enhanced growth, enhanced vigor, improved soil quality, increased yield, improved appearance, and improved quality.

As used herein, the term "agriculturally active ingredient" denotes a compound having a crop or plant protective effect or other crop or plant benefit as described above. In some embodiments the agriculturally active ingredient is selected from the group consisting of pesticides, insecticides, fungicides, herbicides, nematicides, fertilizers, plant growth regulators, biological agents, and combinations of two or more thereof.

The term "stable" when used to describe the foam produced by the formulations and compositions of the invention denotes that the foam is cohesive and does not immediately disintegrate when formed by foaming the formulations or compositions, and applied. Such cohesive foams provide a stable rope of foam when applied in furrow.

The field of agriculture continuously seeks new techniques for formulating and applying agricultural active ingredients such as insecticides, herbicides, fungicides, pesticides, fertilizers, and plant nutrients. In particular, advances are needed that can reduce the volume of agricultural formulation needed to treat a particular area of field. This includes advances in increasing the efficacy of a given volume of an agricultural formulation, as well as advances that allow more precise delivery of an agricultural formulation to the area where it can be most effective. Such high-precision, ultra-low-volume application techniques allow greater areas to be covered while using lower amounts of active ingredient and lower volumes of water.

This results in greater resource efficiency and reduced off-target toxicity, as well as time savings for the grower. Such techniques also reduce the amount of active ingredient applied to areas where such application may be either wasteful or actively harmful. These techniques also have environmental benefits: by reducing the amount of agricultural active that is applied, they reduce the amount that is released into the environment, thereby reducing the pesticide burden. For example, such precise, low volume delivery would minimize off-target toxicity of the agricultural active ingredient, such as the now generally-recognized toxicity of neonicotinoid insecticides to pollinators such as bees. In particular, methods of applying pesticides that are targeted and dustless would be beneficial to controlling such bee toxicity. Precise application of agricultural actives also allows accurate positioning of a lethal dose, which may help to prevent resistant strains of the target pests from developing.

The present disclosure provides ultra-low-volume, high-precision application of agricultural active ingredients by providing a liquid formulation having a high concentration of agricultural active ingredient which is applied to seed in low volume, in-furrow, during planting. In at least one aspect of the present invention, the formulations of the present disclosure can be applied at between 0.25-1.00 gallons/acre, much lower than the volumes at which conventional methods are effective. Preferably the formulations are applied between 0.25 and 0.5 gallons/acre to provide a crop-protective dose to the seeds in situ. In some embodiments the formulations are applied at about 0.3 to about 0.4 gallons/acre. For the purposes of the present disclosure "in situ" application is defined as real-time application of an agricultural active ingredient to previously untreated seed (or previously treated seed), during the planting process. That is, the seed is not pre-coated with the agricultural active ingredient of the present compositions or formulations, although the seed may be pre-coated with one or more crop benefit agents, such as an insecticide or a fungicide, using conventionally known seed treatment technology. Such pre-coated/treated seeds are readily available commercially. According to embodiments of the present invention, the agricultural active ingredient may be applied to seed on the fly, immediately before, as it is being dropped or planted into the soil, or immediately after being dropped or planted into the soil. Broadcast spray of an agricultural ingredient, using typical concentrations and conventional spraying by ground-based equipment, typically requires between 10-40 gallons of liquid per acre. Agricultural actives mixed with fertilizer and applied as a liquid in-furrow typically require about 3-12 gallons of liquid per acre. T-Band application, in which a liquid containing the agricultural active is sprayed into the furrow from a nozzle positioned a few inches above the furrow, typically requires about 3 gallons/acre. Thus, the formulations of the present disclosure substantially reduce the volume of liquid that is required to be carried by the tractor or other mechanical planting equipment. In one embodiment, the foam has an expansion factor between 10 and 100, between preferably between 15 and 80. In another embodiment, the foam may have an expansion factor ranging between 40 and 60.

TABLE 1

Typical Liquid Volumes Needed for Various Agricultural Delivery Methods (4.6 mph w/ 30" Rows)

| | Acre | | | Rate | |
|---|---|---|---|---|---|
| Application | Gallons/acre | mL/acre | Distance mL/foot | mL/second | mL/minute |
| Broadcast Liquid | 25[a] | 94625 | 5.43 | 36.66 | 2199 |
| Fertilizer Liquid | 9[b] | 34065 | 1.96 | 13.20 | 792 |
| T-Band Liquid | 3[c] | 11355 | 0.65 | 4.40 | 264 |
| Diluted Liquid Foam formulation | 0.25[d] | 946 | 0.05 | 0.37 | 22 |
| Expanded Foam formulation (25X) | 6.25[e] | 23656 | 1.36 | 9.16 | 550 |
| Expanded Foam formulation (50X) | 12.50[f] | 47303 | 2.43 | 16.38 | 983 |

[a,b,c,d]volume of the formulations when diluted with water.
[e]volume of foam when the diluted liquid foam formulation is aerated and expanded ×25.
[f]volume of foam when the diluted liquid foam formulation is aerated and expanded ×50.

Suitable liquid formulations for use with the present invention include low-volume and ultra-low-volume formulations having a high concentration of agricultural active ingredient. Preferably the weight % of total agricultural active ingredient ranges from about 15% to about 80% based on the weight of the entire formulation. In some embodiments the concentration of the agricultural active ingredient is about 40% to about 60% by weight. In other embodiments the concentration of the agricultural active ingredient is ≥15%, or ≥20%, or ≥25%, or ≥30%, or ≥35%, ≥40%, or ≥45%, or ≥50%, or ≥55%, or ≥60%, or ≥65% by weight. In other embodiments the concentration of the agricultural active ingredient is at least 40%, 45%, 50%, 55%, 60%, 65%, 70%, 75%, or 80%. In still other embodiment the concentration of the agricultural active ingredient is about 18%, or about 48%, or about 50%, or about 61% by weight.

In at least one embodiment the liquid formulation comprises an organic solvent phase comprising liquid hydrocarbons, liquid amides or mixtures thereof. In one embodiment, the amide solvents are linear solvents including, without limitation, N,N-dimethyloctanamide, N,N-dimethyldecanamide, N-methyl-N-(2-propylheptyl)-acetamide, N-methyl-N-(2-propylheptyl)-formamide, and dimethyl formamide. In another embodiment, the solvent comprises a cyclic amide. Examples of cyclic amides which may be used include N-octyl-2-pyrrolidone, N-dodecyl-2-pyrrolidone and N-dodecyl-caprolactam. In one preferred embodiment, the amide solvent is a linear solvent including but not limited to N,N-dimethyloctanamide, N,N-dimethyldecanamide, N-methyl-N-(2-propylheptyl)-acetamide, N-methyl-N-(2-propylheptyl)-formamide, or dimethyl formamide.

The formulations of the present disclosure are stable, concentrated compositions suitable for low-volume application, and in certain cases, may also be suitable for generation of air-based foams in a dynamic system. Planting equipment is large, with a substantial distance from the foam generation chamber to the nozzle or dispensing orifice through which the foam is delivered to the furrow. In order to survive until delivery in-furrow, the foam should be stable as it flows through the conduit from the foam generation chamber to the nozzle or dispensing orifice. But the fluid dynamics of that flow can cause a foam to break down. As a result, foams that are stable when stationary are not necessarily stable when they flow through a conduit. Similarly, the characteristics of a foam generated in an ambient atmosphere can be substantially different than a foam generated within an enclosure, e.g. conduit.

Foams generated from certain formulations of the present disclosure are stable when formed and delivered through the apparatus and corresponding methods as described below. As noted above, the term "stable" when used to describe the foam produced by the formulations and compositions of the invention denotes that the foam is cohesive and does not immediately disintegrate when formed by foaming the formulations or compositions, and applied. Such cohesive foams provide a stable rope of foam when applied. Another factor in the development of the foamable formulations of the present disclosure is the important role of water quality and other environmental conditions in affecting the quality of the foam resulting from the present foamable formulations. Environmental conditions on a farm are uncontrolled. Weather can vary from cold, humid conditions to hot, dry conditions within a short period of time. Available water sources can vary in their pH and in their hardness. The formulations of the present disclosure generate acceptable low-volume mixtures with water, and/or form foams under a wide range of environmental conditions. For example, the formulations disclosed herein, and the associated apparatus and methods for deploying these formulations, do not require any heat treatments to be applied to the system (i.e. to formulation or apparatus) components. This advantageously reduces the design complexity, operating costs and power demands of the system. However, it would be apparent to one of ordinary skill that heating/cooling capability can be readily incorporated into the present disclosure, if so desired. Moreover, the formulations disclosed herein can be deposited or ejected from a nozzle or dispensing orifice which is placed in close proximity to the furrow. For purposes of illustration and not limitation, in an exemplary embodiment the nozzle can be located within a furrow at approximately 2-4 inches from the ground. The positioning of the nozzle in such proximity to the furrow is beneficial as it inhibits or eliminates undesired scattering of the formulation due to wind gusts and the like, or breakage of a foam, so that a stable rope of foam is applied.

Thus, the formulations and compositions of the invention, in combination with the methods, kits, apparatus and systems of the invention produce and apply a stable foam that gives a stable rope-like appearance in furrow. As used herein, a "rope" of foam is produced by continuous discharge from the apparatus and systems of the invention and is characterized by its appearance as an essentially continuous cylinder of foam within a furrow. Among other attributes the rope may be continuous throughout the length of the entire furrow. Among other attributes the rope may be periodically broken within a furrow, with periodicity of the breaks occurring once every 500 ft or so, or once every 100 ft or so, or once every 50 ft or so, or with a break periodicity of once every 10 ft or so. Among other attributes, the foamable formulation that forms such a foam rope has a viscosity that can range from 3 to 10,000 cps, preferably 10 to 7000 cps, alternatively at least 10 cps. The density of the foam is between 0.01 g/mL and 0.03 g/mL preferably the density of the foam is between 0.01634 g/mL and 0.0212 g/mL.

As a result of the formulation flow stability, the formulations of the present disclosure may be applied through a nozzle or dispensing orifice directly in-furrow to seeds as they are being planted. This direct, precise application of the active ingredient to where it is most needed may further reduce the amount of active ingredient that is applied, and also reduces the volume carried on the tractor or other mechanical planting equipment.

The liquid formulations of the present disclosure include at least one active ingredient, at least one surfactant, and at least one solvent, which may be water. It is recognized that the formulations may include more than one active ingredient, surfactant and/or solvent. They may be prepared and used without dilution, or they may be diluted with water before use or during use. The formulation may be diluted by mixing with water in the storage tank on the tractor or other mechanical planting equipment ("tank mixing") during planting. In these embodiments the formulation can be configured such that the mixture will remain stable upon mixing (i.e. introducing water to the formulation).

Alternatively, the formulation can be configured such that mixture with water will require agitation, wherein the agitation can be provided by a mechanical mixture member (not shown) located within the tank. Additionally or alternatively, the mixing motion can be provided by the vibration and oscillation induced by normal operation of the tractor or other mechanical planting equipment over the terrain. In other embodiments, mixing the formulation with water can occur inline while it is being pumped to a foaming chamber. In an exemplary embodiment, the mixing can occur at a location upstream of the discharge or ejection nozzle(s).

Additionally, a valve(s) (e.g. a solenoid valve) can be positioned at a location between the mixture point (i.e., where water is introduced to the formulation) and the discharge nozzle or dispensing orifice which can serve to open and close the conduit on demand. This can be advantageous as it allows for intermittent stoppage of the formulation discharge (e.g. during periods when the tractor or other mechanical planting equipment is beyond the planting/application area) without interfering with or reducing the time required for sufficient interaction between the formulation and the water. In other words, the valve(s) can be located at a point downstream from the mixture point (i.e. where water is introduced to the formulation) such that the water has enough time (and length within the conduit) to interact with the formulation to generate the desired formulation consistency and characteristics.

The valve(s) can then open and close as desired to allow formulation to dispense from the nozzles. When the valve(s) is closed, the tractor or other mechanical planting equipment can reposition as needed without wasting any of the formulation. The formulation is retained in a "standby" mode within the conduit and is ready for discharge as soon as the valve is re-opened. Accordingly, the system disclosed herein minimizes waste due to unwanted discharge of formulation (e.g. when a tractor or other mechanical planting equipment is repositioning), as well as the dwell time required to prepare the formulation for discharge (since the formulation can be retained close to the nozzle location rather than in a tank disposed upstream).

The active ingredient of the formulation is an agriculturally appropriate active ingredient that can be formulated in a suspension concentrate or other appropriate formulation type, including herbicides, insecticides, fungicides, and fertilizers or combinations of two or more thereof. The final concentration of the active ingredient in the formulation can range from 0.1-6.00 lbs a.i./gallon, 0.75-4.00 lbs a.i./gallon, and preferably from 0.75-2.00 lbs a.i./gallon.

Suitable active ingredients for the formulations of the present disclosure include the following:

Insecticides: A1) the class of carbamates consisting of aldicarb, alanycarb, benfuracarb, carbaryl, carbofuran, carbosulfan, methiocarb, methomyl, oxamyl, pirimicarb, propoxur and thiodicarb; A2) the class of organophosphates consisting of acephate, azinphos-ethyl, azinphos-methyl, chlorfenvinphos, chlorpyrifos, chlorpyrifos-methyl, demeton-S-methyl, diazinon, dichlorvos/DDVP, dicrotophos, dimethoate, disulfoton, ethion, fenitrothion, fenthion, isoxathion, malathion, methamidaphos, methidathion, mevinphos, monocrotophos, oxymethoate, oxydemetonmethyl, parathion, parathion-methyl, phenthoate, phorate, phosalone, phosmet, phosphamidon, pirimiphos-methyl, quinalphos, terbufos, tetrachlorvinphos, triazophos and trichlorfon; A3) the class of cyclodiene organochlorine compounds such as endosulfan; A4) the class of fiproles consisting of ethiprole, fipronil, pyrafluprole and pyriprole; A5) the class of neonicotinoids consisting of acetamiprid, chlothianidin, dinotefuran, imidacloprid, nitenpyram, thiacloprid and thiamethoxam; A6) the class of spinosyns such as spinosad and spinetoram; A7) chloride channel activators from the class of mectins consisting of abamectin, emamectin benzoate, ivermectin, lepimectin and milbemectin; A8) juvenile hormone mimics such as hydroprene, kinoprene, methoprene, fenoxycarb and pyriproxyfen; A9) selective homopteran feeding blockers such as pymetrozine, flonicamid and pyrifluquinazon; A10) mite growth inhibitors such as clofentezine, hexythiazox and etoxazole; A11) inhibitors of mitochondrial ATP synthase such as diafenthiuron, fenbutatin oxide and propargite; uncouplers of oxidative phosphorylation such as chlorfenapyr; A12) nicotinic acetylcholine receptor channel blockers such as bensultap, cartap hydrochloride, thiocyclam and thiosultap sodium; A13) inhibitors of the chitin biosynthesis type 0 from the benzoylurea class consisting of bistrifluron, diflubenzuron, flufenoxuron, hexaflumuron, lufenuron, novaluron and teflubenzuron; A14) inhibitors of the chitin biosynthesis type 1 such as buprofezin; A15) moulting disruptors such as cyromazine; A16) ecdyson receptor agonists such as methoxyfenozide, tebufenozide, halofenozide and chromafenozide; A17) octopamin receptor agonists such as amitraz; A18) mitochondrial complex electron transport inhibitors pyridaben, tebufenpyrad, tolfenpyrad, flufenerim, cyenopyrafen, cyflumetofen, hydramethylnon, acequinocyl or fluacrypyrim;A19) voltage-dependent sodium channel blockers such as indoxacarb and metaflumizone; A20) inhibitors of the lipid synthesis such as spirodiclofen, spiromesifen and spirotetramat; A21) ryanodine receptor-modulators from the class of diamides consisting of flubendiamide, the phthalamide compounds (R)-3-Chlor-N1-{2-methyl-4-[1,2,2,2-tetrafluor-1-(trifluormethyl)ethyl]phenyl}-N2-(1-methyl-2-methylsulfonylethyl)phthalamid and (S)-3-Chlor-N1-{2-methyl-441,2,2,2-tetrafluor-1-(trifluormethyl)ethyl]phenyl}-N2-(1-methyl-2-methylsulfonylethyl)phthalamid, chloranthraniliprole and cyantraniliprole; A22) compounds of unknown or uncertain mode of action such as azadirachtin, amidoflumet, bifenazate, fluensulfone, piperonyl butoxide, pyridalyl, sulfoxaflor; or A23) sodium channel modulators from the class of pyrethroids consisting of acrinathrin, allethrin, bifenthrin, cyfluthrin, gamma-cyhalothrin, lambda-cyhalothrin, cypermethrin, alpha-cypermethrin, beta-cypermethrin, zeta-cypermethrin, deltamethrin, esfenvalerate, etofenprox, fenpropathrin, fenvalerate, flucythrinate, tau-fluvalinate, permethrin, silafluofen, tefluthrin and tralomethrin and any suitable combinations thereof.

Fungicides: B1) azoles selected from the group consisting of bitertanol, bromuconazole, cyproconazole, difenoconazole, diniconazole, enilconazole, epoxiconazole, fluquinconazole, fenbuconazole, flusilazole, flutriafol, hexaconazole, imibenconazole, ipconazole, metconazole, myclobutanil, penconazole, propiconazole, prothioconazole, simeconazole, triadimefon, triadimenol, tebuconazole, tetraconazole, triticonazole, prochloraz, pefurazoate, imazalil, triflumizole, cyazofamid, benomyl, carbendazim, thia-bendazole,fuberidazole, ethaboxam, etridiazole and hymexazole, azaconazole, diniconazole-M, oxpoconazol, paclobutrazol, uniconazol, 1-(4-chloro-phenyl)-2-([1,2,4]triazol-1-yl)-cycloheptanol and imazalilsulfphate; B2) strobilurins selected from the group consisting of azoxystrobin, dimoxystrobin, enestroburin, fluoxastrobin, kresoxim-methyl, methominostrobin, orysastrobin, picoxystrobin, pyraclostrobin, trifloxystrobin, methyl (2-chloro-541-(3-methylbenzyloxyimino)ethyl]benzyl)carbamate, methyl (2-chloro-5-[1-(6-methylpyridin-2-ylmethoxyimino)ethyl]benzyl)carbamate and methyl 2-(ortho-(2,5-dimethylphenyloxymethylene)-phenyl)-3-methoxyacrylate, 2-(2-(6-(3-chloro-2-methyl-phenoxy)-5-fluoro-pyrimidin-4-yloxy)-phenyl)-2-methoxyimino-N-methyl-acetamide and 3-methoxy-2-(2-(N-(4-methoxy-phenyl)-cyclopropanecarboximidoylsulfanylmethyl)-phenyl)-acrylic acid methyl ester; B3) carboxamides selected from the group consisting of carboxin, benalaxyl, benalaxyl-M, fenhexamid, flutolanil, furametpyr, mepronil, metalaxyl, mefenoxam, ofurace, oxadixyl, oxycarboxin, penthiopyrad, isopyrazam, thifluzamide, tiadinil, 3,4-dichloro-N-(2-cyanophenyl)isothiazole-5-carboxamide, dimethomorph, flumorph, flumetover, fluopicolide (picobenzamid), zoxamide, carpropamid, diclocymet, mandipropamid, N-(2-(443-(4-chlorophenyl)prop-2-ynyloxy]-3-methoxyphenyl)ethyl)-2-methanesulfonyl-amino-3-methylbutyramide, N-(2-(4-[3-(4-chloro-phenyl)prop-2-ynyloxy]-3-methoxy-phenyl)ethyl)-2-ethanesulfonylamino-3-methylbutyramide, methyl 3-(4-chlorophenyl)-3-(2-isopropoxycarbonyl-amino-3-methyl-butyrylamino) propionate, N-(4'-bromobiphenyl-2-yl)-4-difluoromethylA-methylthiazole-6-carboxamide, N-(4'-trifluoromethyl-biphenyl-2-yl)-4-difluoromethyl-2-methylthiazole-5-carboxamide, N-(4'-chloro-3'-fluorobiphenyl-2-yl)-4-difluoromethyl-2-methyl-thiazole-5-carboxamide, N-(3',4'-dichloro-4-fluorobiphenyl-2-yl)-3-difluoro-methyl-1-methyl-pyrazole-4-carboxamide, N-(3',4'-dichloro-5-fluorobiphenyl-2-yl)-3-difluoromethyl-1-methylpyrazole-4-carboxamide, N-(2-cyano-phenyl)-3,4-dichloroisothiazole-5-carboxamide, 2-amino-4-methyl-thiazole-5-carboxanilide, 2-chloro-N-(1,1,3-trimethyl-indan-4-yl)-nicotinamide, N-(2-(1,3-dimethylbutyl)-phenyl)-1,3-dimethyl-5-fluoro-1H-pyrazole-4-carboxamide, N-(4'-chloro-3',5-difluoro-biphenyl-2-yl)-3-difluoromethyl-1-methyl-1H-pyrazole-4-carboxamide, N-(4'-chloro-3',5-difluoro-biphenyl-2-yl)-3-trifluoromethyl-1-methyl-1H-pyrazole-4-carboxamide, N-(3', 4'-dichloro-5-fluoro-biphenyl-2-yl)-3-trifluoromethyl-1-methyl-1H-pyrazole-4-carboxamide, N-(3', 5-difluoro-4'-methyl-biphenyl-2-yl)-3-difluoromethyl-1-methyl-1H-pyrazole-4-carboxamide, N-(3', 5-difluoro-4'-methyl-biphenyl-2-yl)-3-trifluoromethyl-1-methyl-1H-pyrazole-4-carboxamide, N-(cis-2-bicyclopropyl-2-yl-phenyl)-3-difluoromethyl-1-methyl-1H-pyrazole-4-carboxamide, N-(trans-2-bicyclopropyl-2-yl-phenyl)-3-difluoro-methyl-1-methyl-1H-pyrazole-4- carboxamide, fluopyram, N-(3-ethyl-3,5-5-trimethyl-cyclohexyl)-3-formylamino-2-hydroxy-benzamide, oxytetracyclin, silthiofam, N-(6-methoxy-pyridin-3-yl) cyclopropanecarboxamide, 2-iodo-N-phenyl-benzamide, N-(2-bicyclo-propyl-2-yl-phenyl)-3-difluormethyl-1-methylpyrazol-4-ylcarboxamide, N-(3',4',5'-trifluorobiphenyl-2-yl)-1,3-dimethylpyrazol-4-ylcarboxamide, N-(3',4',5'-trifluorobiphenyl-2-yl)-1,3-dimethyl-5-fluoropyrazol-4-ylcarboxamide, N-(3',4',5'-trifluorobiphenyl-2-yl)-5-chloro-1,3-dimethyl-pyrazol-4-ylcarboxamide, N-(3',4',5'-trifluorobiphenyl-2-yl)-3-fluoromethyl-1-methylpyrazol-4-ylcarboxamide, N-(3',4',5'-trifluorobiphenyl-2-yl)-3-(chlorofluoromethyl)-1-methylpyrazol-4-ylcarboxamide, N-(3',4',5'-trifluorobiphenyl-2-yl)-3-difluoromethyl-1-methylpyrazol-4-ylcarboxamide, N-(3',4',5'-trifluorobiphenyl-2-yl)-3-difluoromethyl-5-fluoro-1-methylpyrazol-4-ylcarboxamide, N-(3',4',5'-trifluorobiphenyl-2-yl)-5-chloro-3-difluoromethyl-1-methylpyrazol-4-ylcarboxamide, N-(3',4',5'-trifluorobiphenyl-2-yl)-3-(chlorodifluoromethyl)-1-methylpyrazol-4-ylcarboxamide, N-(3',4',5'-trifluorobiphenyl-2-yl)-1-methyl-3-trifluoromethylpyrazol-4-ylcarboxamide, N-(3',4',5'-trifluorobiphenyl-2-yl)-5-fluoro-1-methyl-3-trifluoromethylpyrazol-4-ylcarboxamide, N-(3',4',5'-trifluorobiphenyl-2-yl)-5-chloro-1-methyl-3-trifluoromethylpyrazol-4-ylcarboxamide, N-(2',4',5'-trifluorobiphenyl-2-yl)-1,3-dimethylpyrazol-4-ylcarboxamide, N-(2',4',5'-trifluorobiphenyl-2-yl)-1,3-dimethyl-5-fluoropyrazol-4-ylcarboxamide, N-(2',4',5'-trifluorobiphenyl-2-yl)-5-chloro-1,3-dimethylpyrazol-4-ylcarboxamide, N-(2',4',5'-trifluorobiphenyl-2-yl)-3-fluoromethyl-1-methylpyrazol-4-ylcarboxamide, N-(2',4',5'-trifluorobiphenyl-2-yl)-3-(chlorofluoromethyl)-1-methylpyrazol-4-ylcarboxamide, N-(2',4',5'-trifluorobiphenyl-2-yl)-3-difluoromethyl-1-methylpyrazol-4-ylcarboxamide, N-(2',4',5'-trifluorobiphenyl-2-yl)-3-difluoromethyl-5-fluoro-1-methylpyrazol-4-ylcarboxamide, N-(2',4',5'-trifluorobiphenyl-2-yl)-5-chloro-3-difluoromethyl-1-methylpyrazol-4-ylcarboxamide, N-(2',4',5'-trifluorobiphenyl-2-yl)-3-(chlorodifluoromethyl)-1-methylpyrazol-4-ylcarboxamide, N-(2',4',5'-trifluorobiphenyl-2-yl)-1-methyl-3-trifluoromethylpyrazol-4-ylcarboxamide, N-(2',4',5'-trifluorobiphenyl-2-yl)-5-fluoro-1-methyl-3-trifluoromethylpyrazol-4-ylcarboxamide, N-(2',4',5'-trifluorobiphenyl-2-yl)-5-chloro-1-methyl-3-trifluoromethylpyrazol-4-ylcarboxamide, N-(3',4'-dichloro-3-fluorobiphenyl-2-yl)-1-methyl-3-trifluoromethyl-1H-pyrazole-4-carboxamide, N-(3',4'-dichloro-3-fluorobiphenyl-2-yl)-1-methyl-3-difluoromethyl-1H-pyrazole-4-carboxamide, N-(3',4'-difluoro-3-fluorobiphenyl-2-yl)-1-methyl-3-trifluoromethyl-1H-pyrazole-4-carboxamide, N-(3',4'-difluoro-3-fluorobiphenyl-2-yl)-1-methyl-S-difluoromethyl-1H-pyrazole-4-carboxamide, N-(3'-chloro-4'-fluoro-3-fluorobiphenyl-2-yl)-1-methyl-3-difluoromethyl-1H-pyrazole-4-carboxamide, N-(3',4'-dichloro-4-fluorobiphenyl-2-yl)-1-methyl-3-trifluoromethyl-1H-pyrazole-4-carboxamide, N-(3',4'-difluoro-4-fluorobiphenyl-2-yl)-1-methyl-S-trifluoromethyl-1H-pyrazole-4-carboxamide, N-(3',4'-dichloro-4-fluorobiphenyl-2-yl)-1-methyl-3-difluoromethyl-1H-pyrazole-4-carboxamide, N-(3',4'-difluoro-4-fluorobiphenyl-2-yl)-1-methyl-3-difluoromethyl-1H-pyrazole-4-carboxamide, N-(3'-chloro-4'-fluoro-4-fluorobiphenyl-2-yl)-1-methyl-S-difluoromethyl-1H-pyrazole-4-carboxamide, N-(3',4'-dichloro-5-fluorobiphenyl-2-yl)-1-methyl-3-difluoromethyl-1H-pyrazole-4-carboxamide, N-(3',4'-difluoro-5-fluorobiphenyl-2-yl)-1-methyl-3-trifluoromethyl-1H-pyrazole-4-carboxamide, N-(3',4'-dichloro-5-fluorobiphenyl-2-yl)-1-methyl-S-difluoromethyl-1H-pyrazole-carboxamide, N-(3',4'-difluoro-5-fluorobiphenyl-2-yl)-1-methyl-3-difluoromethyl-1H-pyrazole-4-carboxamide, N-(3',4'-dichloro-5-fluorobiphenyl-2-yl)-1,3-dimethyl-1H-pyrazole-4-carboxamide, N-(3'-chloro-4'-fluoro-5-fluorobiphenyl-2-yl)-1-methyl-3-difluoromethyl-1H-pyrazole-4-carboxamide, N-(4'-fluoro-4-fluorobiphenyl-2-yl)-1-methyl-3-trifluoromethyl-1H-pyrazole-4-carboxamide, N-(4'-fluoro-5-fluorobiphenyl-2-yl)-1-methyl-3-trifluoromethyl-1H-pyrazole-4-carboxamide, N-(4'-chloro-5-fluorobiphenyl-2-yl)-1-methyl-3-trifluoromethyl-1H-pyrazole-4-carboxamide, N-(4'-methyl-5-fluorobiphenyl-2-yl)-1-methyl-3-trifluoromethyl-1H-pyrazole-4-carboxamide, N-(4'-fluoro-5-fluorobiphenyl-2-yl)-1,3-dimethyl-1H-pyrazole-4-carboxamide, N-(4'-chloro-5-fluorobiphenyl-2-yl)-1,3-dimethyl-1H-pyrazole-4-carboxamide, N-(4'-methyl-5-fluorobiphenyl-2-yl)-1,3-dimethyl-1H-pyrazole-4-carboxamide, N-(4'-fluoro-6-fluorobiphenyl-2-yl)-1-methyl-3-trifluoromethyl-1H-pyrazole-4-carboxamide, N-(4'-chloro-6-fluorobiphenyl-2-yl)-1-methyl-3-trifluoromethyl-1H-pyrazole-4-carboxamide, N-[2-(1,1,2,3,3,3-hexafluoropropoxy)-phenyl]-3-difluoromethyl-1-methyl-1H-pyrazole-4-carboxamide, N-[4'-(trifluoromethylthio)-biphenyl-2-yl]-3-difluoromethyl-1-methyl-1H-pyrazole-4-carboxamide and N44'-(trifluoromethylthio)-biphenyl-2-yl]-1-methyl-3-trifluoromethyl-1-methyl-1H-pyrazole-4-carboxamide; B4) heterocyclic compounds selected from the group consisting of fluazinam, pyrifenox, bupirimate, cyprodinil, fenarimol, ferimzone, mepanipyrim, nuarimol, pyrimethanil, triforine, fenpiclonil, fludioxonil, aldimorph, dodemorph, fenpropimorph, tridemorph, fenpropidin, iprodione, procymidone, vinclozolin, famoxadone, fenamidone, octhilinone, proben-azole, 5-chloro-7-(4-methyl-piperidin-1-yl)-6-(2,4,6-trifluorophenyl)41,2,4]triazolo[1,5-a]pyrimidine, anilazine, diclomezine, pyroquilon, proquinazid, tricyclazole, 2-butoxy-6-iodo-3-propyl-chromen-4-one, acibenzolar-S-methyl, captafol, captan, dazomet, folpet, fenoxanil, quinoxyfen, N,N-dimethyl-3-(3-bromo-6-fluoro-2-methylindole-1-sulfonyl)-[1,2,4]triazole-1-sulfonamide, 5-ethyl-6-octyl41,2,4]triazolo[1,5-a]pyrimidin-2,7-diamine, 2,3,5,6-tetrachloro-4-methanesulfonyl-pyridine, 3,4,5-trichloro-pyridine-2,6-di-carbonitrile, N-(1-(5-bromo-3-chloro-pyridin-2-yl)-ethyl)-2,4-dichloro-nicotinamide, N-((5-bromo-3-chloro pyridin-2-yl)-methyl)-2,4-dichloro-nicotinamide, diflumetorim, nitrapyrin, dodemorphacetate, fluoroimid, blasticidin-S, chinomethionat, debacarb, difenzoquat, difenzoquat-methylsulphat, oxolinic acid and piperalin; B5) carbamates selected from the group consisting of mancozeb, maneb, metam, methasulphocarb, metiram, ferbam, propineb, thiram, zineb, ziram, diethofencarb, iprovalicarb, benthiavalicarb, propamocarb, propamocarb hydrochlorid, 4-fluorophenyl N-(1-(1-(4-cyanophenyl)-ethanesulfonyl)but-2-yl)carbamate, methyl 3-(4-chloro-phenyl)-3-(2-isopropoxycarbonylamino-3-methyl-butyrylamino)propanoate; or B6) other fungicides selected from the group consisting of guanidine, dodine, dodine free base, iminoctadine, guazatine, antibiotics: kasugamycin, streptomycin, polyoxin, validamycin A, nitrophenyl derivatives: binapacryl, dinocap, dinobuton, sulfur-containing heterocyclyl compounds: dithianon, isoprothiolane, organometallic compounds: fentin salts, organophosphorus compounds: edifenphos, iprobenfos, fosetyl, fosetyl-aluminum, phosphorous acid and its salts, pyrazophos, tolclofos-methyl, organochlorine compounds: dichlofluanid, flusulfamide, hexachloro-benzene, phthalide, pencycuron, quintozene, thiophanate-methyl, tolylfluanide, others: cyflufenamid, cymoxanil, dimethirimol, ethirimol, furalaxyl, metrafenone and spiroxamine, guazatine-acetate, iminoc-tadine-triacetate, iminoctadine-tris(albesilate), kasugamycin hydrochloride hydrate, dichlorophen, pentachlorophenol and its salts, N-(4-chloro-2-nitro-phenyl)-N-ethyl-4-methyl-benzenesulfonamide, did nitrothalisopropyl, tecnazene, biphenyl, bronopol, diphenylamine, mildiomycin, oxincopper, prohexadione calcium, N-(cyclopropylmethoxyimino-(6-difluoromethoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N-methyl formamidine, N'-(4-(4-fluoro-3-trifluoromethyl-phenoxy)-2,5-dimethyl-phenyl)-N-ethyl-N-methyl formamidine, N'-(2-methyl-5-trifluormethyl-4-(3-trimethyl-silanyl-propoxy)-phenyl)-N-ethyl-N-methylformamidine and N'-(5-difluormethyl-2-methyl-4-(3-trimethylsilanyl-propoxy)-phenyl)-N-ethyl-N-methyl formamidine, and any combinations thereof.

Herbicides: C1) acetyl-CoA carboxylase inhibitors (ACC), for example cyclohexenone oxime ethers, such as alloxydim, clethodim, cloproxydim, cycloxydim, sethoxydim, tralkoxydim, butroxydim, clefoxydim or tepraloxydim; phenoxyphenoxypropionic esters, such as clodinafop-propargyl, cyhalofop-butyl, diclofop-methyl, fenoxaprop-ethyl, fenoxaprop-P-ethyl, fenthiapropethyl, fluazifop-butyl, fluazifop-P-butyl, haloxyfop-ethoxyethyl, haloxyfop-methyl, haloxyfop-P-methyl, isoxapyrifop, propaquizafop, quizalofop-ethyl, quizalofop-P-ethyl or quizalofop-tefuryl; or arylaminopropionic acids, such as flamprop-methyl or flamprop-isopropyl; C2 acetolactate synthase inhibitors (ALS), for example imidazolinones, such as imazapyr, imazaquin, imazamethabenz-methyl (imazame), imazamox, imazapic or imazethapyr; pyrimidyl ethers, such as pyrithiobac-acid, pyrithiobac-sodium, bispyribac-sodium. KIH-6127 or pyribenzoxym; sulfonamides, such as florasulam, flumetsulam or metosulam; or sulfonylureas, such as amidosulfuron, azimsulfuron, bensulfuron-methyl, chlorimuron-ethyl, chlorsulfuron, cinosulfuron, cyclosulfamuron, ethametsulfuron-methyl, ethoxysulfuron, flazasulfuron, halosulfuron-methyl, imazosulfuron, metsulfuron-methyl, nicosulfuron, primisulfuron-methyl, prosulfuron, pyrazosulfuron-ethyl, rimsulfuron, sulfometuron-methyl, thifensulfuron-methyl, triasulfuron, tribenuron-methyl, triflusulfuron-methyl, tritosulfuron, sulfosulfuron, foramsulfuron or iodosulfuron; C3) amides, for example allidochlor (CDAA), benzoylprop-ethyl, bromobutide, chiorthiamid. diphenamid, etobenzanidibenzchlomet), fluthiamide, fosamin or monalide; C4) auxin herbicides, for example pyridinecarboxylic acids, such as clopyralid or picloram; or 2,4-D or benazolin; C5) auxin transport inhibitors, for example naptalame or diflufenzopyr; C6) carotenoid biosynthesis inhibitors, for example benzofenap, clomazone (dimethazone), diflufenican, fluorochloridone, fluridone, pyrazolynate, pyrazoxyfen, isoxaflutole, isoxachlortole, mesotrione, sulcotrione (chlormesulone), ketospiradox, flurtamone, norflurazon or amitrol; C7) enolpyruvylshikimate-3-phosphate synthase inhibitors (EPSPS), for example glyphosate or sulfosate; C8) glutamine synthetase inhibitors, for example bilanafos (bialaphos) or glufosinate-ammonium; C9) lipid biosynthesis inhibitors, for example anilides, such as anilofos or mefenacet; chloroacetanilides, such as dimethenamid, S-dimethenamid, acetochlor, alachlor, butachlor, butenachlor, diethatyl-ethyl, dimethachlor, metazachlor, metolachlor, S-metolachlor, pretilachlor, propachlor, prynachlor, terbuchlor, thenylchlor or xylachlor; thioureas, such as butylate, cycloate, di-allate, dimepiperate, EPTC. esprocarb, molinate, pebulate, prosulfocarb, thiobencarb (benthiocarb), tri-allate or vemolate; or benfuresate or perfluidone; C10) mitosis inhibitors, for example carbamates, such as asulam, carbetamid, chlorpropham, orbencarb, pronamid (propyzamid), propham or tiocarbazil; dinitroanilines, such as benefin, butralin, dinitramin, ethalfluralin, fluchloralin, oryzalin, pendimethalin, prodiamine or trifluralin; pyridines, such as dithiopyr or thiazopyr; or butamifos, chlorthal-dimethyl (DCPA) or maleic hydrazide; C11) protoporphyrinogen IX oxidase inhibitors, for example diphenyl ethers, such as acifluorfen, acifluorfen-sodium, aclonifen, bifenox, chlomitrofen (CNP), ethoxyfen, fluorodifen, fluoroglycofenethyl, fomesafen, furyloxyfen, lactofen, nitrofen, nitrofluorfen or oxyfluorfen; oxadiazoles, such as oxadiargyl or oxadiazon; cyclic imides, such as azafenidin, butafenacil, carfentrazone-ethyl, cinidon-ethyl, flumiclorac-pentyl, flumioxazin, flumipropyn, flupropacil, fluthiacet-methyl, sulfentrazone or thidiazimin; or pyrazoles, such as ET-751.JV 485 or nipyraclofen; C12) photosynthesis inhibitors, for example propanil, pyridate or pyridafol; benzothiadiazinones, such as bentazone; dinitrophenols, for example bromofenoxim, dinoseb, dinoseb-acetate, dinoterb or DNOC; dipyridylenes, such as cyperquat-chloride, difenzoquat-methyl sulfate, diquat or paraquat-dichloride; ureas, such as chlorbromuron, chlorotoluron, difenoxuron, dimefuron, diuron, ethidimuron, fenuron, fluometuron, isoproturonisouron, linuron, methabenzthiazuron, methazole, metobenzuron, metoxuron, monolinuron, neburon, siduron or tebuthiuron; phenols, such as bromoxynil or ioxynil; chloridazon; triazines, such as ametryn, atrazine, cyanazine, desmein, dimethamethryn, hexazinone, prometon, prometryn, propazine, simazine, simetryn, terbumeton, terbutryn, terbutylazine or trietazine; triazinones, such as metamitron or metribuzin; uracils, such as bromacil, lenacil or terbacil; or biscarbamates, such as desmedipham or phenmedipham; C13) synergists, for example oxiranes, such as tridiphane; C14) CIS cell wall synthesis inhibitors, for example isoxaben or dichlobenil; C16) various other herbicides, for example dichloropropionic acids, such as dalapon; dihydrobenzofurans, such as ethofumesate; phenylacetic acids, such as chlorfenac (fenac); or aziprotryn, barban, bensulide, benzthiazuron, benzofluor, buminafos, buthidazole, buturon, cafenstrole, chlorbufam, chlorfenprop-methyl, chloroxuron, cinmethylin, cumyluron, cycluron, cyprazine, cyprazole, dibenzyluron, dipropetryn, dymron, eglinazin-ethyl, endothall, ethiozin, flucabazone, fluorbentranil, flupoxam, isocarbamid, isopropalin, karbutilate, mefluidide, monuron, napropamide, napropanilide, nitralin, oxaciclomefone, phenisopham, piperophos, procyazine, profluralin, pyributicarb, secbumetone, sulfallate (CDEC), terbucarb, triaziflam, triazofenamid or trimeturon; or their environmentally compatible salts or combinations thereof.

Nematicides: Benomyl, cloethocarb, aldoxycarb, tirpate, diamidafos, fenamiphos, cadusafos, dichlofenthion, ethoprophos, fensulfothion, fosthiazate, heterophos, isamidofof, isazofos, phosphocarb, thionazin, imicyafos, mecarphon, acetoprole, benclothiaz, chloropicrin, dazomet, fluensulfone, oxamyl, terbufos and suitable combinations thereof.

Plant Growth Regulators: D1) Antiauxins, such as clofibric acid, 2,3,5-triiodobenzoic acid; D2) Auxins such as 4-CPA, 2,4-D, 2,4-DB, 2,4-DEP, dichlorprop, fenoprop, IAA, IBA, naphthaleneacetamide, α-naphthaleneacetic acids, 1-naphthol, naphthoxyacetic acids, potassium naphthenate, sodium naphthenate, 2,4,5-T; D3) cytokinins, such as 21P, benzyladenine, 4-hydroxyphenethyl alcohol, kinetin, zeatin; D4) defoliants, such as calcium cyanamide, dimethipin, endothal, ethephon, merphos, metoxuron, pentachlorophenol, thidiazuron, tribufos; D5) ethylene inhibitors, such as aviglycine, 1-methylcyclopropene; D6) ethylene releasers, such as ACC, etacelasil,ethephon, glyoxime; D7) gametocides, such as fenridazon, maleic hydrazide; D8) gibberellins, such as gibberellins, gibberellic acid; D9) growth inhibitors, such as abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat, piproctanyl, prohydrojasmon, propham, tiaojiean, 2,3,5-tri-iodobenzoic acid; D10) morphactins, such as chlorfluren, chlorflurenol, dichlorflurenol, flurenol; D11) growth retardants, such as chlormequat, daminozide, flurprimidol, mefluidide, paclobutrazol, tetcyclacis, uniconazole; D12) growth stimulators, such as brassinolide, brassinolide-ethyl, DCPTA, forchlorfenuron, hymexazol, prosuler, triacontanol; D13) unclassified plant growth regulators, such as bachmedesh, benzofluor, buminafos, carvone, choline chloride, ciobutide, clofencet, cyanamide, cyclanilide, cycloheximide, cyprosulfamide, epocholeone, ethychlozate, ethylene, fuphenthiourea, furalane, heptopargil, holosulf, inabenfide, karetazan, lead arsenate, methasulfocarb, prohexadione, pydanon, sintofen, triapenthenol, trinexapac.

In another aspect of the present invention, suitable combinations of any one of insecticides, herbicides, fungicides, nematicides and plant growth promoters are provided to expand and provide better coverage in the furrow.

While those of ordinary skill in the art can appreciate that the presently disclosed system illustrates a low volume system for delivering suitable combinations in a larger crop area, and reducing the refill time, it can further expand the coverage in the furrow at higher volumes. For instance, in the case of sweet potatoes, one of ordinary skill in the art may decide to use 3-5 gallons of carrier to expand a foam that is 10-20× more than the amount used for corn. In such an aspect of the invention, the objective is not necessarily to save water volume and reduce refill time, but instead to get much greater coverage or a much larger "zone of protection" than could have been achieved with standard liquid applications. In at least one embodiment, those of ordinary skill in the art would appreciate that added benefits in sweet potatoes due to the zero tolerance for wireworms.

The active ingredient may be added to the formulations of the present disclosure in any appropriate conventional form, for example an emulsion concentrate (EC), a suspension concentrate (SC), a suspo-emulsion (SE), a capsule suspension (CS), a water dispersible granule (WG), an emulsifiable granule (EG), a water in oil emulsion (EO), an oil in water emulsion (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a dispersible concentrate (DC), a wettable powder (WP) or any technically feasible formulation in combination with agriculturally acceptable adjuvants.

Suitable foaming agents may be nonionic surfactants, including alkanolamides (such as cocamide diethanolamide, lauric acid monoisopropanolamide, and ethoxylated myristamide), polyoxyethylene fatty acid esters, polyoxyethylene fatty alcohol ethers (such as alkylaryl polyglycol ethers) and fluorocarbons (such as ethoxylated polyfluorinated alcohol); anionic surfactants including alkyl-, alkylaryl- and arylsulfonates (such as sodium lauryl sarcosinate or sodium alkylbenzenesulfonate), alkyl-, alkylaryl- and ary-lsulfates, protein hydrolysates, derivatives of polycarboxylic acid (such as ammonium lauryl ether carboxylate), olefin sulfonates (such as sodium alpha olefin sulfonate), sarcosinates (such as ammonium cyclohexyl palmitoyl taurinate), succinates (such as disodium N-octadecyl sulfosuccinamate), phosphorus derivatives (such as phosphoric acid esters and their equivalent salts); cationic surfactants including alkylbenzyltrimethylammonium chloride; and amphoteric surfactants including betaine. Particularly preferred foaming agents are Bio-Soft D-40, Bioterge AS-40, Ammonyx DO, Ammonyx LO, Steol CA-330, Cedepal TD-407, and Polystep B-25. The total concentration of foaming agents in the formulation will be dependent on the foaming agents used, and may comprise between about 0.1% and about 50% of the final formulation, preferably between about 0.3% and about 30%, more preferably between about 5% and 25%, and even more preferably between about 17% and about 23%.

In at least one embodiment, the tank mix chemical formulation has a suitable viscosity to allow the active ingredient in the formulation to be delivered at a range of from 0.75 to 4.00 lbs a.i./gallon, and preferably from 0.75 to 2.00 lbs a.i./gallon. Such viscosity can range from 3 to 10,000 cps, preferably 10 to 7000 cps. In at least one embodiment, the viscosity of the formulation is adjusted to the speed of the apparatus to provide optimal foaming at a range of speeds including approximately 4-16 ounces of chemical formulation per acre, and 24 to 64 ounces of water per acre and a ground speed ranging from 2-7 miles per hour. In at least one embodiment, the present invention provides the delivery of the chemical formulation with at least 0.75 lbs a.i./gallon to be delivered at a rate of at least 0.25 gallons/ acre. In another aspect of the instant invention, provides a foamable formulation with an expansion factor of at least 30, 35, 40, 45, 50, 55, 60, 65, 70, 75, 80, 85, 90, 95, or 100.

Suitable foam stabilizers act to stabilize the foam generated from the liquid, foamable formulation. Examples of suitable foam stabilizers include glycerine, Kelzan, carrageenan, xanthan gum, guar gum, gum Arabic, gum tragacanth, polyox, alginin, and sodium alginate. Glycerine and Kelzan are particularly preferred. The total concentration of foam stabilizers in the formulation will be dependent on the foaming agents used, and may comprise between 0.1% and 15% of the total formulation, preferably 1-14%, more preferably 7-12%.

The formulations of the present invention may also include dispersants, and/or preservatives. Suitable dispersants include nonionic and/or ionic substances, for example from the classes of the alcohol-POE and/or -POP ethers, acid and/or POP POE esters, alkylaryl and/or POP POE ethers, fat and/or POP POE adducts, POE- and/or POP-polyol derivatives, POE-and/or POP-sorbitan or -sugar adducts, alkyl- or aryl-sulfates, alkyl- or aryl-sulfonates and alkyl- or aryl-phosphates or the corresponding PO-ether adducts, and mixtures thereof. Alkyl polyglucosides and phosphate esters are preferred dispersants.

Suitable preservatives include but are not limited to C12 to C15 alkyl benzoates, alkyl p-hydroxybenzoates, aloe vera extract, ascorbic acid, benzalkonium chloride, benzoic acid, benzoic acid esters of C9 to C15 alcohols, butylated hydroxytoluene, butylated hydroxyanisole, tert-butylhydroquinone, castor oil, cetyl alcohols, chlorocresol, citric acid, cocoa butter, coconut oil, diazolidinyl urea, diisopropyl adipate, dimethyl polysiloxane, DMDM hydantoin, ethanol, ethylenediaminetetraacetic acid, fatty acids, fatty alcohols, hexadecyl alcohol, hydroxybenzoate esters, iodopropynyl butylcarbamate, isononyl iso-nonanoate, jojoba oil, lanolin oil, mineral oil, oleic acid, olive oil, parabens, polyethers, polyoxypropylene butyl ether, polyoxypropylene cetyl ether, potassium sorbate, propyl gallate, silicone oils, sodium propionate, sodium benzoate, sodium bisulfite, sorbic acid, stearic fatty acid, sulfur dioxide, vitamin E, vitamin E acetate and derivatives, esters, salts and mixtures thereof. Preferred preservatives include sodium o-phenylphenate, 5-chloro-2-methyl-4-isothiazolin-3-one, 2-methyl-4-isothiazolin-3-one, and 1,2-benisothiazolin-3-one.

One aspect of the invention is directed to a method for the in situ treatment of a seed being planted in a furrow, comprising directly applying a liquid formulation to a seed immediately before, during or immediately after planting a seed in a furrow, in an amount sufficient to provide at least one crop benefit effect, where the liquid formulation comprises at least one agriculturally active ingredient. In one embodiment the formulation is delivered into the furrow in a continuous manner. In another embodiment the formulation is delivered into the furrow in a discontinuous manner, where the formulation is applied directly to the planted seed and, optionally, to an area immediately surrounding the planted seed; the formulation can be foamed and applied in the form of a foam rope. In one embodiment the method further comprises the step of covering the treated seed in the furrow with soil immediately after the formulation is applied. In another embodiment the agriculturally active ingredient is selected from the group consisting of pesticides, insecticides, fungicides, herbicides, nematicides, fertilizers, plant growth regulators, biological agents, and combinations of two or more thereof In one embodiment of the method the agriculturally active ingredient is a biological agent. In another embodiment of the method the active ingredient is selected from the group consisting of neonicotinoid insecticides, bifenthrin, biofungicides, and combinations of two or more thereof. In one embodiment of the method the liquid formulation is foamed and applied to the furrow in the form of a stable foam rope. In one embodiment of the method the liquid formulation is foamed and applied to a seed in the form of a stable foam rope.

In one embodiment of the method the formulation is an aqueous composition in the form of a microemulsion, an oil-in-water concentrated emulsion, a suspension, a suspension concentrate, an emulsifiable concentrate, or a microencapsulate that further comprises one or more additives selected from the group consisting of stabilizers, dispersants, surfactants, wetting agents, preservatives, adjuvants, biocides and lubricants.

In one embodiment of the method the formulation comprises a foamable aqueous composition comprising at least one foaming agent and at least one foam stabilizer. In one embodiment the foamable aqueous composition further comprises a gas to produce a foamed agricultural formulation. In one embodiment of the foamable aqueous composition at least one foaming agent is present in the formulation in an amount of about 5% to about 25% by weight of the formulation. In one embodiment of the method a foamed agricultural formulation is applied to the planted seed at an effective rate of about 1 gallon/acre or less, preferably about 0.5 gallon/acre or less, more preferably about 0.3 gallon/acre or less.

Another aspect of the invention is directed to a system for in situ treatment of a seed with a liquid formulation comprising at least one agriculturally active ingredient before, during or after release of a seed from a mechanical planter into a furrow, the system comprising a reservoir containing the formulation, and coupled to a sprayer or other applicator; a seed chamber; at least one conduit coupling the sprayer/applicator associated with the reservoir to the seed chamber; where the seed is released from the seed chamber into the conduit and treated with the formulation by the applicator. Thus, one embodiment is directed to a system for in situ treatment of a seed with a liquid formulation comprising at least one agriculturally active ingredient after release of the seed from a mechanical planter into a furrow, comprising: a reservoir containing the liquid formulation, coupled to an applicator; a seed chamber; and at least one conduit coupled to the seed chamber; where a seed from the seed chamber is treated with the formulation by the applicator after it has been deposited into the furrow. In one embodiment of the system the agriculturally active ingredient is selected from the group consisting of pesticides, insecticides, fungicides, herbicides, nematicides, fertilizers, plant growth regulators, biological agents, and combinations of two or more thereof. In another embodiment the active ingredient is selected from the group consisting of neonicotinoid insecticides, bifenthrin, biofungicides, and combinations of two or more thereof. In a further embodiment of the system the agriculturally active ingredient is a biological agent. In one embodiment of the system the liquid formulation is foamed and applied to the seed by the applicator in the form of a stable foam rope as it passes into the furrow.

Yet another aspect of the invention is directed to a system for in situ treatment of a seed with a liquid formulation comprising at least one agriculturally active ingredient, after release of the seed from a mechanical planter into a furrow, comprising a reservoir containing the liquid formulation, and coupled to a sprayer or other applicator; a seed chamber; and at least one conduit coupled to the seed chamber; where a seed from the seed chamber is treated with the formulation by the applicator immediately after it has been deposited into the furrow. In one embodiment of the system the agriculturally active ingredient is selected from the group consisting of pesticides, insecticides, fungicides, herbicides, nematicides, fertilizers, plant growth regulators, biological agents, and combinations of two or more thereof. In another embodiment the active ingredient is selected from the group consisting of neonicotinoid insecticides, bifenthrin, biofungicides, and combinations of two or more thereof. In a further embodiment the agriculturally active ingredient is a biological agent. In one embodiment the liquid formulation is foamed and applied in the form of a stable foam rope.

Still another aspect of the invention is directed to a system for dispensing a foamable liquid agricultural formulation, comprising a mechanical planter capable of dispensing the formulation as a foam, comprising a foam mixing chamber configured to receive a foamable formulation, and a compressible fluid carrier, the foamable formulation comprising at least one agriculturally active ingredient, at least one foaming agent, and at least one foam stabilizer; a foaming medium positioned within the foam mixing chamber such that the compressed fluid drives the formulation through the foaming medium to a foam outlet; at least one conduit associated with the foam outlet, the conduit configured to deliver foamed formulation created in the foam mixing chamber to a delivery nozzle or dispensing orifice; and the delivery nozzle further directed to a furrow; where delivery of the foamed formulation into the furrow before, during or after a seed is planted in the furrow provides an amount of foam sufficient to produce at least one crop benefit effect to the seed. In one embodiment the foamed formulation is delivered into the furrow in a continuous manner. In another embodiment the foamed formulation is delivered into the furrow in a discontinuous manner, whereby the foamed formulation is applied directly to the seed and, optionally, to an area immediately surrounding the seed. In one embodiment of the system an effective amount of the foamed formulation is delivered into the furrow at an effective rate of about 1 gallon/acre or less, preferably about 0.5 gallon/ acre or less, more preferably about 0.3 gallon/acre or less. In one embodiment of the system the agriculturally active ingredient is present in the liquid agricultural formulation in the form of a suspension concentrate that is stable over a time period of about 1-2 years. In one embodiment the agriculturally active ingredient is a biological agent. In one embodiment the foamable formulation has a viscosity of at least 10 cps and is delivered to the furrow as a foamed formulation at a rate of about 0.75 lbs a.i./acre. In one embodiment of the system the foamed formulation has an expansion factor of at least about 25. In another embodiment the foamed formulation has an expansion factor of up to about 50 or greater. In one embodiment of the system the agriculturally active ingredient is selected from the group consisting of pesticides, insecticides, fungicides, herbicides, nematicides, fertilizers, plant growth regulators, biological agents, and combinations of two or more thereof. In an embodiment the agriculturally active ingredient is a biological agent. In another embodiment the active ingredient is selected from the group consisting of neonicotinoid insecticides, bifenthrin, biofungicides, and combinations of two or more thereof. In one embodiment of the system the foamed formulation delivered into the furrow is in the form of a stable foam rope.

A further embodiment of the invention is directed to a crop-protective system for providing at least one crop benefit treatment in a crop growing environment, comprising applying to a seed, before, during or after planting the seed in a furrow, a liquid formulation comprising at least one agriculturally active ingredient, where the formulation is applied in an amount sufficient to produce at least one crop benefit effect to the seed. In one embodiment of the system the formulation is applied in a continuous manner. In another embodiment of the system the formulation is applied in a discontinuous manner, whereby the formulation is applied directly to the seed and, optionally, to an area immediately surrounding the seed. In one embodiment of the system the amount of water in the formulation is from 0% to about 45% by weight based on the total weight of the formulation. In one embodiment the formulation further comprises at least one foaming agent and at least one foam stabilizer. In one embodiment of the system the agriculturally active ingredient is selected from the group consisting of pesticides, insecticides, fungicides, herbicides, nematicides, fertilizers, plant growth regulators, biological agents, and combinations of two or more thereof. In an embodiment the agriculturally active ingredient is a biological agent. In another embodiment the active ingredient is selected from the group consisting of neonicotinoid insecticides, bifenthrin, biofungicides, and combinations of two or more thereof. In one embodiment of the system the liquid formulation is applied in the form of a stable foam rope. In one embodiment of the system the liquid formulation is foamed and applied in the form of a stable foam rope.

Another aspect of the invention is directed to a system for in situ benefit of seeds comprising a) a liquid plant benefit formulation, and b) an application means for applying an effective amount of the liquid formulation to a seed while planting in a furrow; where the application means applies the formulation to the seeds immediately before, during or immediately after planting in the furrow; the formulation can be foamed and applied in the form of a foam rope. In one embodiment the treated planted seed is covered with soil in the same operation. In one embodiment of the system the formulation is applied in a continuous manner. In another embodiment the formulation is applied in a discontinuous manner, whereby the formulation is applied directly to the seed and, optionally, to an area immediately surrounding the seed. In one embodiment of the system the formulation is applied at an effective rate of about 1 gallon/acre or less, preferably about 0.5 gallon/acre or less, more preferably about 0.3 gallon/acre or less. In one embodiment of the system the agriculturally active ingredient is selected from the group consisting of pesticides, insecticides, fungicides, herbicides, nematicides, fertilizers, plant growth regulators, biological agents, and combinations of two or more thereof. In an embodiment the agriculturally active ingredient is a biological agent. In another embodiment the active ingredient is selected from the group consisting of neonicotinoid insecticides, bifenthrin, biofungicides, and combinations of two or more thereof.

Still another aspect of the invention is directed to a method for in situ benefit of seeds during planting, comprising the steps of a) applying an effective amount of a liquid plant benefit formulation to a seed while planting in a furrow, and b) covering the treated seed in the furrow with soil in the same operation; where the liquid formulation is applied to the seed immediately before, during or immediately after planting in the furrow. In one embodiment of the method the formulation is applied in a continuous manner. In another embodiment the formulation is applied in a discontinuous manner, whereby the formulation is applied directly to the seed and, optionally, to an area immediately surrounding the seed. In one embodiment of the method the formulation is applied at an effective rate of about 1 gallon/acre or less, preferably about 0.5 gallon/acre or less, more preferably about 0.3 gallon/acre or less. In one embodiment of the method the agriculturally active ingredient is selected from the group consisting of pesticides, insecticides, fungicides, herbicides, nematicides, fertilizers, plant growth regulators, biological agents, and combinations of two or more thereof. In an embodiment the agriculturally active ingredient is a biological agent. In another embodiment the active ingredient is selected from the group consisting of neonicotinoid insecticides, bifenthrin, biofungicides, and combinations of two or more thereof. In one embodiment of the method the liquid formulation is foamed and applied to a seed in the form of a stable foam rope.

Yet another aspect of the invention is directed to a low-volume liquid agricultural formulation, comprising at least one agriculturally active ingredient selected from the group consisting of insecticides, pesticides, fungicides, herbicides, fertilizers, plant growth regulators, plant growth promoters, biological agents, and combinations of two or more thereof; where the low-volume liquid agricultural formulation contains from 0% to about 45% by weight of water, based on the total weight of the liquid agricultural formulation, and where the low-volume liquid agricultural formulation is not a foamable formulation. In one embodiment the low-volume liquid formulation contains from about 1% to about 10% by weight of water. In one embodiment the neonicotinoid insecticide is selected from the group consisting of imidacloprid, thiamethoxam, nitenpyram, acetamiprid, dinotefuran, thiacloprid, and clothianidin. In one embodiment the neonicotinoid insecticide is present in an amount from about 5% to about 40%. In another embodiment of the low-volume liquid agricultural formulation the fungicide is a biofungicide which comprises a biologically pure culture of *Bacillus* sp. D747 strain having properties beneficial to plant growth. In one embodiment the *Bacillus* sp. D747 is deposited as FERM BP-8234. In one embodiment the bacterial strain is in the form of spores or vegetative cells. In one embodiment the biologically pure culture of the *Bacillus* sp. D747 strain deposited as FERM BP-8234 is present in about $7.6 \times 10^9$ CFU/ml to about $1.2 \times 10^{10}$ CFU/ml.

In one embodiment the low-volume liquid agricultural formulation further comprises one or more active ingredients selected from the group consisting of pesticides, insecticides, fungicides, herbicides, nematicides, fertilizers, plant growth regulators, biologicals, and combinations of two or more thereof. In one embodiment the active ingredient comprises both a neonicotinoid and bifenthrin. In another embodiment the active ingredient comprises both bifenthrin and a biofungicide. In some embodiments bifenthrin is present in an amount from about 5% to about 40%. In some embodiments the low-volume liquid agricultural formulation comprises a dispersant and a preservative. In one embodiment the agriculturally active ingredient is present in the form of a suspension concentrate that is stable over a time period of about 1-2 years.

Still another aspect of the invention is directed to a kit for preparing a foamable liquid agricultural formulation comprising a container; a low-volume liquid agricultural formulation comprising a biologically pure culture of *Bacillus* sp. D747 strain and bifenthrin, disposed within the container; and optionally, instructions for delivering the formulation to a seed of a plant in an amount effective to provide at least one crop benefit effect. In one embodiment of the kit one or more additional agriculturally active ingredient are present selected from the group consisting of pesticides, insecticides, fungicides, herbicides, nematicides, fertilizers, plant growth regulators, biological agents, and combinations of two or more thereof. In another embodiment the active ingredient is selected from the group consisting of neonicotinoid insecticides, bifenthrin, biofungicides, and combinations of two or more thereof. In a further embodiment the agriculturally active ingredient is an additional biological agent.

Yet another aspect of the invention is directed to a method of reducing the exposure of pollinators and other beneficial insects to pesticides, comprising the steps of a) applying an effective amount of a liquid plant benefit formulation to a seed while planting in a furrow in an agricultural field comprising pollinators and/or other beneficial insects, and b) immediately covering the treated seed in the furrow with soil in the same operation; where the liquid formulation is applied to the seed immediately before, during or immediately after planting in the furrow. In one embodiment of the method the liquid plant benefit formulation comprises an agriculturally active ingredient selected from the group consisting of pesticides, insecticides, fungicides, herbicides, nematicides, fertilizers, plant growth regulators, biological agents, and combinations of two or more thereof. In an embodiment the agriculturally active ingredient is a biological agent. In another embodiment the active ingredient is selected from the group consisting of neonicotinoid insecticides, bifenthrin, biofungicides, and combinations of two or more thereof. In one embodiment of the method the liquid formulation is foamed and applied to a seed in the form of a stable foam rope.

A further aspect of invention is directed to a method of reducing soil-applied pesticide burden, comprising targeted direct application of a liquid formulation to a seed immediately before, during or immediately after planting a seed in a furrow, in an amount sufficient to provide at least one crop benefit effect, where the liquid formulation comprises at least one agriculturally active ingredient. In one embodiment of the method the liquid formulation comprises an agriculturally active ingredient selected from the group consisting of pesticides, insecticides, fungicides, herbicides, nematicides, fertilizers, plant growth regulators, biological agents, and combinations of two or more thereof. In an embodiment the agriculturally active ingredient is a biological agent. In another embodiment the active ingredient is selected from the group consisting of neonicotinoid insecticides, bifenthrin, biofungicides, and combinations of two or more thereof. In one embodiment of the method the liquid formulation is foamed and applied to a seed in the form of a stable foam rope.

Yet another aspect of invention is directed to a method of dust-free application of pesticides, comprising the steps of a) applying an effective amount of a liquid plant benefit formulation to a seed while planting in a furrow, and b) immediately covering the treated seed in the furrow with soil in the same operation; where the liquid formulation is applied to the seed immediately before, during or immediately after planting in the furrow, and where the application does not generate pesticide-containing dust. In one embodiment of the method the liquid plant benefit formulation comprises an agriculturally active ingredient selected from the group consisting of pesticides, insecticides, fungicides, herbicides, nematicides, fertilizers, plant growth regulators, biological agents, and combinations of two or more thereof. In an embodiment the agriculturally active ingredient is a biological agent. In another embodiment the active ingredient is selected from the group consisting of neonicotinoid insecticides, bifenthrin, biofungicides, and combinations of two or more thereof. In one embodiment of the method the liquid formulation is foamed and applied to a seed in the form of a stable foam rope.

Still another aspect of invention is directed to a method of in situ custom treatment of a crop seed with a crop benefit composition, comprising directly applying a liquid crop benefit composition to a crop seed immediately before, during or immediately after planting a crop seed in a furrow in an agricultural field, in an amount sufficient to provide at least one crop benefit effect specific to the needs of the crop in the agricultural field, where the liquid composition comprises at least one agriculturally active ingredient. In one embodiment of the method the liquid crop benefit composition comprises an agriculturally active ingredient selected from the group consisting of pesticides, insecticides, fungicides, herbicides, nematicides, fertilizers, plant growth regulators, biological agents, and combinations of two or more thereof. In an embodiment the agriculturally active ingredient is a biological agent. In another embodiment the active ingredient is selected from the group consisting of neonicotinoid insecticides, bifenthrin, biofungicides, and combinations of two or more thereof. In one embodiment of the method the liquid composition is foamed and applied to a crop seed in the form of a stable foam rope.

Another aspect of invention is directed to a method of enhancing the activity of low soil-mobile crop benefit agents, comprising the step of directly applying a liquid formulation comprising at least one crop benefit agent having low soil-mobility to a seed immediately before, during or immediately after planting the seed in a furrow, in an amount sufficient to provide at least one crop benefit effect. In one embodiment of the method the liquid formulation comprises an agriculturally active ingredient selected from the group consisting of pesticides, insecticides, fungicides, herbicides, nematicides, fertilizers, plant growth regulators, biological agents, and combinations of two or more thereof. In another embodiment the active ingredient is selected from the group consisting of neonicotinoid insecticides, bifenthrin, biofungicides, and combinations of two or more thereof. In a further embodiment the agriculturally active ingredient is a biological agent. In one embodiment of the method the liquid formulation is foamed and applied to a seed in the form of a stable foam rope.

One aspect of invention is directed to a method of enhancing seed benefit, comprising directly applying a liquid crop benefit formulation to a seed immediately before, during or immediately after planting a seed in a furrow, in an amount sufficient to provide at least one crop benefit effect, where the liquid formulation comprises at least one agriculturally active ingredient. In one embodiment of the method the seed is a pre-treated seed. In another embodiment the seed is an untreated seed. In one embodiment of the method the liquid crop benefit formulation comprises an agriculturally active ingredient selected from the group consisting of pesticides, insecticides, fungicides, herbicides, nematicides, fertilizers, plant growth regulators, biological agents, and combinations of two or more thereof. In another embodiment the active ingredient is selected from the group consisting of neonicotinoid insecticides, bifenthrin, biofungicides, and combinations of two or more thereof. In a further embodiment the agriculturally active ingredient is a biological agent. In one embodiment of the method the liquid formulation is foamed and applied to a seed in the form of a stable foam rope.

Another aspect of invention is directed to a method for on-demand precision seed treatment, comprising directly applying a liquid formulation to a seed immediately before, during or immediately after planting a seed in a furrow, in an amount sufficient to provide at least one crop benefit effect, where the liquid formulation comprises at least one agriculturally active ingredient. In one embodiment of the method the liquid formulation comprises an agriculturally active ingredient selected from the group consisting of pesticides, insecticides, fungicides, herbicides, nematicides, fertilizers, plant growth regulators, biological agents, and combinations of two or more thereof. In another embodiment the active ingredient is selected from the group consisting of neonicotinoid insecticides, bifenthrin, biofungicides, and combinations of two or more thereof. In a further embodiment the agriculturally active ingredient is a biological agent. In one embodiment of the method the liquid formulation is foamed and applied to a seed in the form of a stable foam rope.

Still another aspect of invention is directed to a system for on-demand precision seed treatment, comprising a) a liquid plant benefit formulation, and b) an application means for targeted application of an effective amount of the liquid formulation to a seed while planting in a furrow; where the application means applies the formulation to the seeds immediately before, during or immediately after planting in the furrow. In one embodiment of the system the liquid plant benefit formulation comprises an agriculturally active ingredient selected from the group consisting of pesticides, insecticides, fungicides, herbicides, nematicides, fertilizers, plant growth regulators, biological agents, and combinations of two or more thereof. In another embodiment the active ingredient is selected from the group consisting of neonicotinoid insecticides, bifenthrin, biofungicides, and combinations of two or more thereof. In a further embodiment the agriculturally active ingredient is a biological agent. In one embodiment of the system the application means applies a foamed liquid formulation to a seed in the form of a stable foam rope.

One aspect of the invention is directed to a method for the in situ treatment of a seed being planted in a furrow, comprising directly applying a liquid formulation to a seed immediately before, during or immediately after planting a seed in a furrow, in an amount sufficient to provide at least one crop benefit effect, where the liquid formulation comprises at least one agriculturally active ingredient. In one embodiment the formulation is delivered into the furrow in a continuous manner. In another embodiment the formulation is delivered into the furrow in a discontinuous manner, where the formulation is applied directly to the planted seed and, optionally, to an area immediately surrounding the planted seed; the formulation can be foamed and applied in the form of a foam rope. In one embodiment the method further comprises the step of covering the treated seed in the furrow with soil immediately after the formulation is applied. In one embodiment of the method the liquid plant benefit formulation comprises an agriculturally active ingredient selected from the group consisting of pesticides, insecticides, fungicides, herbicides, nematicides, fertilizers, plant growth regulators, biological agents, and combinations of two or more thereof. In another embodiment the active ingredient is selected from the group consisting of neonicotinoid insecticides, bifenthrin, biofungicides, and combinations of two or more thereof. In a further embodiment the agriculturally active ingredient is a biological agent. In one embodiment of the method the liquid formulation is foamed and applied to a seed in the form of a stable foam rope.

An additional aspect of the invention is directed to a crop-protective system for providing at least one crop benefit treatment in a crop growing environment, comprising applying to a furrow immediately before, during or immediately after planting a seed in the furrow a liquid formulation comprising at least one agriculturally active ingredient, where the formulation is applied in an amount sufficient to produce at least one crop benefit effect to the seed. In one embodiment of the system the liquid plant benefit formulation comprises an agriculturally active ingredient selected from the group consisting of pesticides, insecticides, fungicides, herbicides, nematicides, fertilizers, plant growth regulators, biological agents, and combinations of two or more thereof. In another embodiment the active ingredient is selected from the group consisting of neonicotinoid insecticides, bifenthrin, biofungicides, and combinations of two or more thereof. In a further embodiment the agriculturally active ingredient is a biological agent. In one embodiment of the system the liquid formulation is foamed and applied to a furrow in the form of a stable foam rope.

Another additional aspect of the invention is directed to a system for in situ benefit of seeds, comprising a) a liquid plant benefit formulation, and b) an application means for applying an effective amount of the liquid formulation to a furrow while planting a seed in the furrow; where the application means applies the formulation to the furrow immediately before, during or immediately after planting the seed in the furrow; the formulation can be foamed and applied in the form of a foam rope. In one embodiment the treated planted seed is covered with soil in the same operation. In one embodiment of the system the liquid plant benefit formulation comprises an agriculturally active ingredient selected from the group consisting of pesticides, insecticides, fungicides, herbicides, nematicides, fertilizers, plant growth regulators, biological agents, and combinations of two or more thereof. In another embodiment the active ingredient is selected from the group consisting of neonicotinoid insecticides, bifenthrin, biofungicides, and combinations of two or more thereof. In a further embodiment the agriculturally active ingredient is a biological agent. In one embodiment of the system the application means applies a foamed liquid formulation to a furrow in the form of a stable foam rope.

A further additional aspect of the invention is directed to a method for in situ benefit of seeds during planting, comprising the steps of a) applying an effective amount of a liquid plant benefit formulation to a furrow while planting in a seed in the furrow, and b) covering the treated seed in the furrow with soil in the same operation; where the liquid formulation is applied to the furrow immediately before, during or immediately after planting a seed in the furrow. In one embodiment of the method the liquid plant benefit formulation comprises an agriculturally active ingredient selected from the group consisting of pesticides, insecticides, fungicides, herbicides, nematicides, fertilizers, plant growth regulators, biological agents, and combinations of two or more thereof. In another embodiment the active ingredient is selected from the group consisting of neonicotinoid insecticides, bifenthrin, biofungicides, and combinations of two or more thereof. In a further embodiment the agriculturally active ingredient is a biological agent. In one embodiment of the method the liquid formulation is foamed and applied to a furrow in the form of a stable foam rope.

Other Examples of suitable foaming formulations can be found in Applicant's copending application U.S. patent application Ser. No. 14/502,251, which is incorporated by reference in its entirety.

Example 2

Bifenthrin technical (95.8%) was added to Agnique® PG9116 and Dextrol™ OC-180 and milled until reduced to a $D_{90}$ of less than 4 microns. The remaining ingredients were added in the proportions given below and mixed in a low speed mixer:

| Bifenthrin 1.6 SC | |
|---|---|
| | % w/w |
| Bifenthrin Technical, 95.8% | 18.40 |
| Glycerine | 12.70 |
| Agnique ® PG9116 | 1.25 |
| Dextrol ™ OC-180 | 1.25 |
| Polystep ® B-25 | 20.00 |
| Kathon ™ ICP/CG | 0.10 |
| Dowicide ® A | 0.10 |
| Proxel ® GXL | 0.10 |
| Water | 45.78 |
| Kelzan ® | 0.32 |
| | 100.00 |

EXAMPLES

Example 1

Bifenthrin technical (514.29 g) was combined with Agnique® PG9116 (35.00 g, available from Cognis Corp.), Dextrol™ OC-180 (35.00 g, available from Ashland Inc.), and deionized water (815.71 g), then milled until the bifenthrin was reduced to a D90 of less than 2 microns. The resulting bifenthrin SC was then mixed in a low-speed mixer with glycerine, Stepwet® DF-95 (available from Stepan Co.), Biosoft® D-40 (available from Stepan Co.), Ammonyx® DO (available from Stepan Co.), Kathon™ CG/ICP (available from Dow Chemical Co.), Kelzan® (2% aqueous solution), and deionized water to create 18 foamable formulations. Compositions are given as weight percent of total formulation in the following tables.

Example 3

Foamable Formulation Containing a Biological Agent

| | % w/w | Grams |
|---|---|---|
| Water DI | 41.59 | 166.35 |
| Bifenthrin, 98.6% pure | 17.39 | 69.57 |
| Dry BaD747 CX9025 | 5.00 | 20.00 |
| Glycerin | 12.70 | 50.80 |
| Agnique ® PG 9116 | 1.50 | 6.00 |
| Dextrol ™ OC-180 | 1.50 | 6.00 |
| Kelzan ® | 0.32 | 1.28 |
| Polystep ® B25 | 20.00 | 80.00 |
| | 100.00 | 400.00 |

| Formulation No. | 1-1 | 1-2 | 1-3 | 1-4 | 1-5 | 1-6 | 1-7 | 1-8 | 1-9 | 1-10 |
|---|---|---|---|---|---|---|---|---|---|---|
| Bifenthrin | 60.9 | 60.9 | 60.9 | 60.9 | 60.9 | 60.9 | 60.9 | 60.9 | 60.9 | 60.9 |
| Glycerine | 11.0 | 11.0 | 11.0 | 11.0 | 11.0 | 11.0 | 11.0 | 11.0 | 11.0 | 11.0 |
| Stepwet ® DF-95 | 5.0 | 3.8 | 3.8 | 1.3 | 2.5 | 10.0 | 5.0 | 0.0 | 7.5 | 7.5 |
| Biosoft ® D-40 | 7.5 | 1.9 | 4.4 | 1.9 | 13.8 | 0.0 | 5.0 | 0.0 | 8.8 | 3.8 |
| Ammonyx ® DO | 7.5 | 4.4 | 1.9 | 6.9 | 3.8 | 10.0 | 0.0 | 10.0 | 3.8 | 8.8 |
| Kathon ™ ICP/CG | 0.1 | 0.1 | 0.1 | 0.1 | 0.1 | 0.1 | 0.1 | 0.1 | 0.1 | 0.1 |
| Kelzan ® 2% | 8.0 | 8.0 | 8.0 | 8.0 | 8.0 | 8.0 | 8.0 | 8.0 | 8.0 | 8.0 |
| Water | 0.0 | 9.9 | 9.9 | 9.9 | 0.0 | 0.0 | 10.0 | 10.0 | 0.0 | 0.0 |

| Formulation No. | 1-11 | 1-12 | 1-13 | 1-14 | 1-15 | 1-16 | 1-17 | 1-18 |
|---|---|---|---|---|---|---|---|---|
| Bifenthrin | 60.9 | 60.9 | 60.9 | 60.9 | 60.9 | 60.9 | 60.9 | 60.9 |
| Glycerine | 11.0 | 11.0 | 11.0 | 11.0 | 11.0 | 11.0 | 11.0 | 11.0 |
| Stepwet ® DF-95 | 10.0 | 2.5 | 0.0 | 2.5 | 0.0 | 5.0 | 1.3 | 0.0 |
| Biosoft ® D-40 | 10.0 | 3.8 | 10.0 | 3.8 | 20.0 | 0.0 | 6.9 | 0.0 |
| Ammonyx ® DO | 0.0 | 3.8 | 0.0 | 13.8 | 0.0 | 5.0 | 1.9 | 20.0 |
| Kathon ™ ICP/CG | 0.1 | 0.1 | 0.1 | 0.1 | 0.1 | 0.1 | 0.1 | 0.1 |
| Kelzan ® 2% | 8.0 | 8.0 | 8.0 | 8.0 | 8.0 | 8.0 | 8.0 | 8.0 |
| Water | 0.0 | 9.9 | 10.0 | 0.0 | 0.0 | 10.0 | 9.9 | 0.0 |

To well-agitated water using an overhead paddle stirrer, add glycerin, Agnique® PG9116 and Dextrol™ OC-180 and mix until dissolved/dispersed. Add the bifenthrin and mix until a smooth dispersion if formed. Add this dispersion to an Eiger™ mini-mill or equivalent bead mill and mill until particle size is achieved, for example 90% of the particles are <3 μm, while keeping the temperature below 30° C. Transfer the mixture back to a vessel with an overhead paddle stirrer and blend in Polystep® B25 and Kelzan®, and finally add the BaD747 CX9025, mixing until thoroughly dispersed.

The formulation could be foamed using air with acceptable expansion ratios.

Stability studies: freeze/thaw (F/T) and 2 week stability at 54° C.

|  | Suspension % | Wet sieve | | | Viscosity, cps | | Particle Size | | pH | | | | |
| --- | --- | --- | --- | --- | --- | --- | --- | --- | --- | --- | --- | --- | --- |
| Condition | 342 ppm | 50 | 100 | 325 | 5 rpm | 50 rpm | 90%< | 50%< | as is | 1% | density g/cc | bleed % | sediment |
| initial | 100 | 0 | 0 | 0 | 5620 | 990 | 1.4 | 0.2 | 5.7 | 5 | 1.1026 | | |
| freeze/thaw | 100 | 0 | 0 | 0 | 5300 | 960 | 2.9 | 0.4 | 5.4 | 6 | | 0 | 0 |
| 2 wk/54° C. | 100 | 0 | 0 | 0 | 4400 | 766 | 2.8 | 1.3 | 5.4 | 5 | | 0 | 0 |

The data indicates that the foamable composition comprising a biological agent is stable.

Example 4

Emulsion Formulation for Insecticidal Foam Compositions. Preparation of an Emulsion Formulation Containing Bifenthrin for Foam Generation A mixture of 3.92 grams of bifenthrin technical (95.8 purity), 9.31 grams of a mixture of N,N-dimethyloctanamide and N,N-dimethyldecanamide (Hallcomid® M-8-10 from Stepan Company), 7.19 grams of methyloleate (Amesolv® CME from Amethech), 2.57 grams of calcium dodecyl benzene sulfonate (Rhodacal® 60/BE from Solvay Group), 0.76 gram of an ethopropoxylated alcohol (Antarox® B/848 from Solvay Group), 2.57 grams of a mixes alkoxyether of cetyl alcohol (Procetyl™ AWS from Crodia Inc.) and 3.79 grams of a 40% sodium decyl sulfate solution (Polystep® B25 from Stepan Company) was stirred at ambient temperature until a homogenous solution was obtained.

Additional formulations were also prepared using the method of Example 4 and are summarized in the Table below, designated as Examples A through E.

Other Examples of suitable emulsion formulations can be found in Applicant's copending application U.S. patent application Ser. No. 14/748,371, which is incorporated by reference in its entirety.

Example 5

Preparation of a Liquid Composition Comprising Bifenthrin and *Bacillus* sp. D747 Strain Deposited as FERM BP-8234

Into a CMC SuperMill feed tank was added 4.9935 kilograms of deionized water, 1.3316 kilograms of a C9-11 alkyl polyglycoside (AGNIQUE® PG 9116, available from Cognis), 1.1651 kilograms of an ethoxylated aliphatic alcohol phosphate ester potassium salt (Dextrol™ OC-180, available from Ashland Specialty Ingredients), 16.6 grams of an anti-foam agent (XIAMETER® AFE-0100 Antifoam Emulsion FG, available from Dow Corning Corporation), 16.6 grams of sodium benzoate, 1606 grams of potassium sorbate and 1.5813 kilograms of ammonium sulfate. The mill was started and the contents were mixed until uniform. Crystalline bifenthrin technical (97.2% purity) was added portion wise and after complete addition the contents mixed for about one hour. The contents of the feed tank was transferred to the mill, keeping the mill temperature at 40° F., and milled until a particle size of about 7 microns ($D_{90}$) was obtained. Once the desired particle size was obtained, 1.0 kilogram of deionized water was added to the feed tank and pumped through the mill contents. A liquid attapulgite suspension aid, 1.498 kilograms of ATTAFLOW® FL (available from BASF The Chemical Company) was added and the mixture blended until uniform. Acetic acid, 16.6 grams, was added and incorporated until homogenous. *Bacillus* sp. strain D747 (available from Certis USA), 832.2 grams of a dry powder containing at least $2 \times 10^{11}$ CFU bacillus spores, was added and the mixture stirred until homogenous.

Portions of the bifenthrin/bacillus formulation were stored in sealed glass containers for stability testing. Table 2

TABLE

Additional Emulsion Formulations

| Ingredient* | Example A (grams) | Example B (grams) | Example C (grams) | Example D (grams) | Example E (grams) |
| --- | --- | --- | --- | --- | --- |
| Bifenthrin | 84.50 | 5.44 | 5.20 | 195.08 | 3.76 |
| Hallcomid ® | 201.50 | 8.80 | 14.0 | 465.03 | 9.05 |
| Amesolv ® | 156.01 | 0 | 0 | 361.74 | 0 |
| Rhodacal ® | 55.38 | 4.02 | 5.40 | 127.50 | 3.83 |
| Antarox ® | 16.25 | 1.06 | 1.0 | 37.55 | 1.21 |
| procetyl ™ | 55.25 | 4.23 | 6.44 | 127.5 | 5.01 |
| Polystep ® | 81.20 | 13.53 | 8.06 | 187.84 | 4.28 |
| Aromatic 100 | 0 | 0 | 0 | 0 | 3.30 |
| Glycerin | 0 | 0 | 0 | 0 | 1.07 |

*Aromatic 100 is Aromatic 100 Fluid, a light aromatic solvent naphtha from ExxonMobile Chemicals.
Hallcomid ® is a mixture of N,N-dimethyloctanamide and N,N-dimethyldecanamide (Hallcomid ® M-8-10 from Stepan Company).

summarizes the initial and monthly spore viability was measured on samples kept at 25° C. Samples stored at room temperature or 35° C. were analyzed at 1, 2, and 3 months and found to be physically and chemically stable at each time period. A sample stored at 54° C. for two weeks was found to be physically and chemically stable. Another sample was subjected to three freeze and thaw cycles and found to be physically and chemically stable. As can be seen from the data in the Table below, the *Bacillus spores* in the formulation remain viable after 177 days storage at 25° C.

TABLE

*Bacillus* sp. strain D747 viability testing of samples stored at 25° C.

| CFU/mL Time 0 | 22 Days | 52 Days | 83 Days | 113 Days | 147 Days | 177 Days |
|---|---|---|---|---|---|---|
| $1.2 \times 10^{10}$ | $1.1 \times 10^{10}$ | $1.2 \times 10^{10}$ | $1.2 \times 10^{10}$ | $1.2 \times 10^{10}$ | $1.2 \times 10^{10}$ | $1.4 \times 10^{10}$ |

Field Testing: The formulation of Example 2 was tested on a field test unit to determine its foaming characteristics, including stability when pumped through a conduit and expansion factor. The formulation was tank mixed with water, to an active ingredient concentration of 4.6%, and the resulting fluid was foamed and applied with a four-row configuration at a speed of 5.2 mph and a rate of 32 oz./acre (0.1 lbs a.i./acre). The four rows generated expansion factors of 40.0, 45.7, 46.7, and 44.5 (mean 44.2).

Delivery System

In accordance with another aspect of the present disclosure, a delivery system 10 is provided for installation on agricultural equipment (e.g. seed planters) that delivers a high expansion foam, as described above, in the seed furrow using an ultra-low rate of water carrier. The apparatus and corresponding methods of this delivery system can be incorporated into an original equipment manufacturer (OEM) design and fabricated as a new machine, or alternatively, provided as a kit for retro-fitting existing agricultural equipment. Additionally, while the delivery system is described herein integrated with agricultural equipment, it is further contemplated that components of the system may be incorporated in a standalone delivery system, for example, a backpack delivery system that can be utilized by an individual farmer.

The system applies a foaming formulation, as described above, into the furrow with a total volume of water and chemical used of, for example, 32 to 64 ounces per acre. The system utilizes water, compressed air, and the foaming chemical formulation to generate the high expansion aqueous foam which is then delivered to the individual seed row furrows.

Additionally, the system 10 described herein automatically adjusts the amount of water and chemical being used to maintain the proper application rate depending on section width and speed of the planter, as well as distributing the foam evenly between rows and monitoring the flow of foam to each these rows for volume, quality and blockage.

Referring to FIGS. 1-12, an exemplary delivery system 10 in accordance with an embodiment of the invention will be described. With reference to FIG. 1, the delivery system 10 includes a control module 12, a tank and pump assembly 100, 200, a valve assembly 20, 30, foam mixing chambers 40, monitoring units 70, control valves 80 and delivery nozzles 84. The control module 12 includes a "computing device" or "electronic device" that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, and portable electronic devices such as smartphones, personal digital assistants, tablet computers, laptop computers and the like. The control module 12 may be a standalone device or may be integrated with computing or electronic devise already provided on the agricultural equipment.

The control module 12 is configured to communicate with the agricultural equipment to monitor the operating state of the agricultural equipment, for example, the ground speed of the equipment and the operational state of each planter (e.g. planting or not planting, seed delivery rate). The control module 12 is also configured to communicate with various components of the delivery system to receive operational information from the components and to send control signals to the components as will be described in more detail hereinafter. The control module 12 may also be configured to communicate with a remote network. The control module 12 may send information to the remote network, for example, operating history of the delivery system 10, such that the information may be stored, analyzed or otherwise used apart from the delivery system 10. The control module 12 may receive information from the remote network which may assist with control of the components. For example, historical data on chemical selection and application rate for a given crop in a given region may be communicated to the control module 12 to facilitate optimization of the delivery system 10. Other storage, processing and control may be completed utilizing the control module 12, alone or in combination with the remote network.

Referring to FIG. 2, an exemplary tank and pump assembly 100 in accordance with an embodiment of the invention will be described. In the present embodiment, the chemical formulation and water are contained within a single tank 102 (referred to as "tank mixing" herein). The tank 102 has a sufficient capacity (e.g. 150 gallons). The water conduit (or line, which may be used interchangeably throughout this disclosure) 104 is coupled to the tank 102 to provide water from an external source for mixing with the chemical formulation. The water conduit includes a valve 105 for controlling the flow of water and can be operated on a continuous or intermittent basis, as so desired. Additionally, a tank rinse nozzle 106 can be incorporated into water conduit 104 which can accelerate and disperse the water about the interior of the tank at sufficient pressure to remove any chemical residue or debris. Although the exemplary embodiment disclosed herein describes conduit 100 as a water delivery line, it will be understood by artisans of ordinary skill that a medium other than, or in addition to, water can be employed in the system described herein.

The tank mix configuration of the present system mixes the chemical formulation with water in a single tank to achieve the desired application rate of both water and chemical formulation. The mixed solution exits the tank through a line 108 and a hand controlled ball valve 110 into a strainer 112. The line contains a tee that will allow for a vacuum switch 114, which monitors the line to verify that there is solution in the system. The vacuum switch is preferably in communication with the control module 12, and if no solution is detected, the control module 12 can generate an alarm to alert an operator to check for blockages, or a shut off signal to terminate the system operation. Further downstream the line then tees again to allow for an optional pump 116 that can be used for agitation. In some embodiments, the pump 116 and agitation line 118 are provided to deliver a medium, e.g. water, into the tank at a controlled pressure so as to stir up the solution. Alternatively, the chemical formulation employed within the system may remain stable and dispersed without the need for agitation, thereby rendering the agitation pump and line unnecessary.

The main line 108 then enters a pump 120 which is monitored by the control module 12 to maintain an optimal flow rate. The speed of the pump is adjusted by the control module 12 to maintain the desired rate based on various factors, for example, ground speed or section width of the planter. In one embodiment, the pump 120 is a 12-volt electric positive displacement metering pump that is rated for a maximum flow of 44 ounces per minute. The pump is preferably a positive displacement, non-return metering pump. Downstream of the pump 120, the fluid stream (i.e. mixture of chemical formulation and water) then continues to a solenoid valve manifold block 20 through line 14. A monitoring unit 70 may be positioned along the line 14 to insure the flow has not been interrupted.

Figure 9:
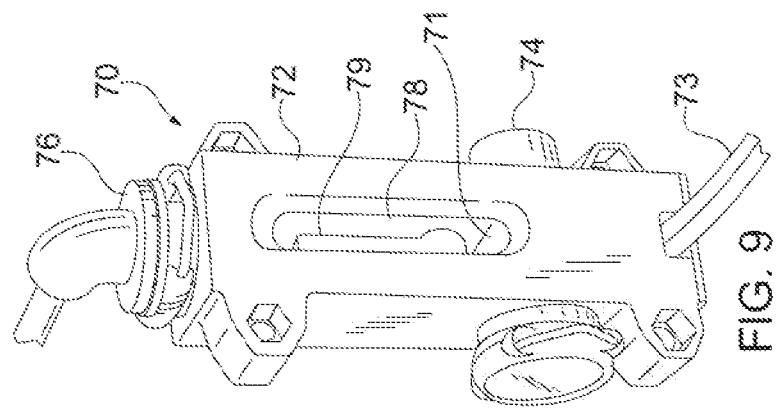
FIG. 9 is a perspective view of a monitoring unit in accordance with an embodiment of the invention.
Figure 14:
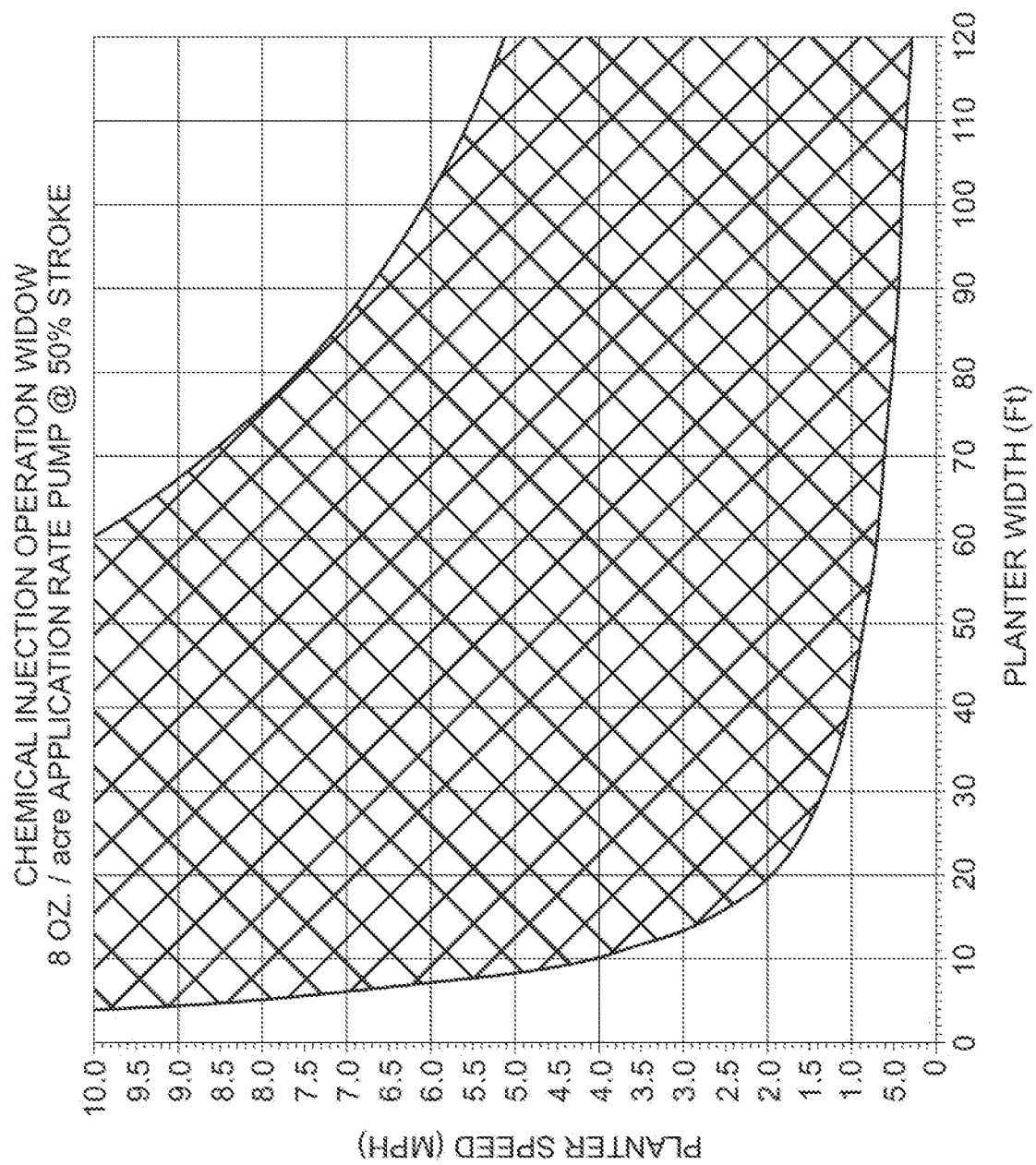
Figure 15:
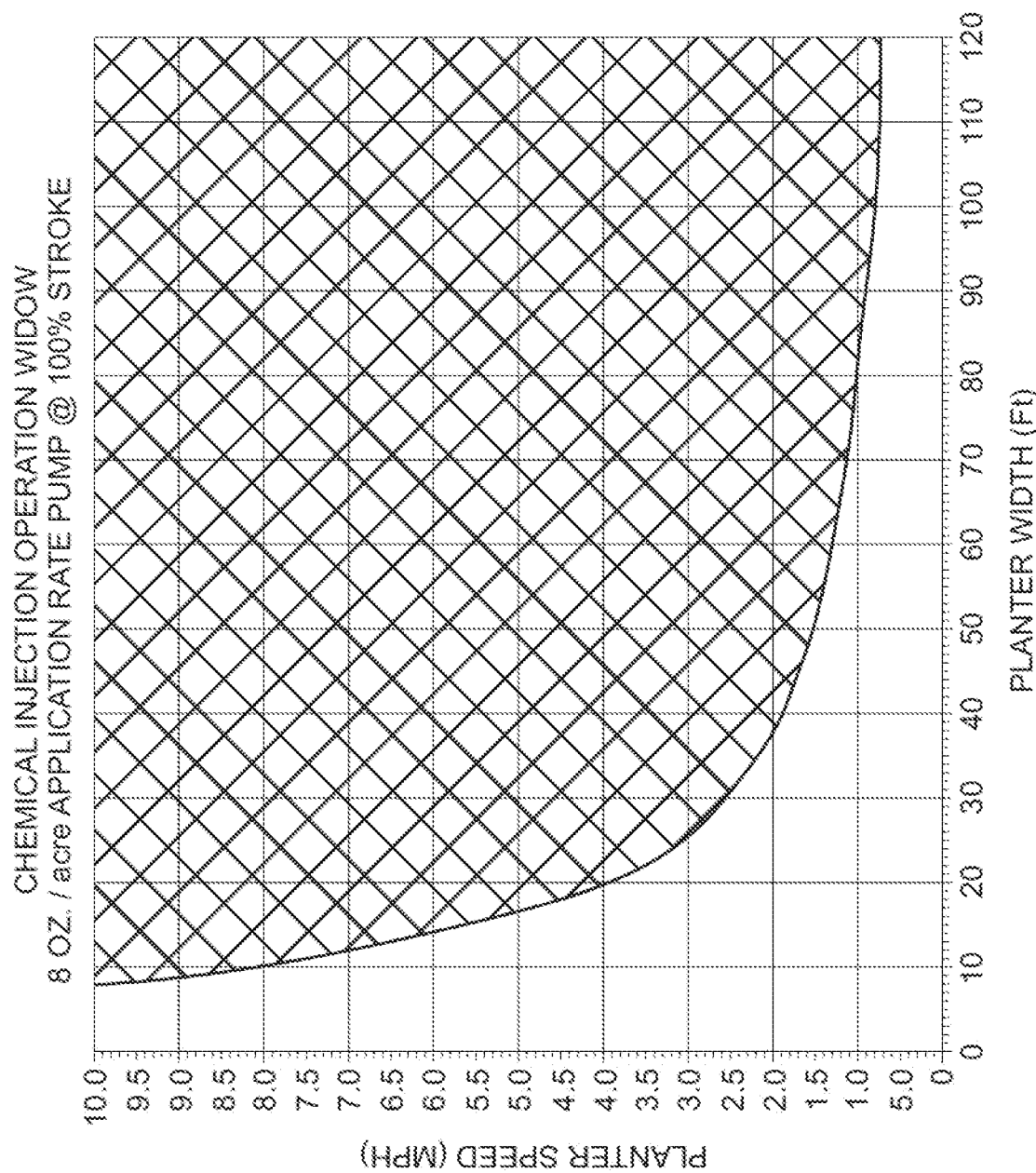
Figure 16:
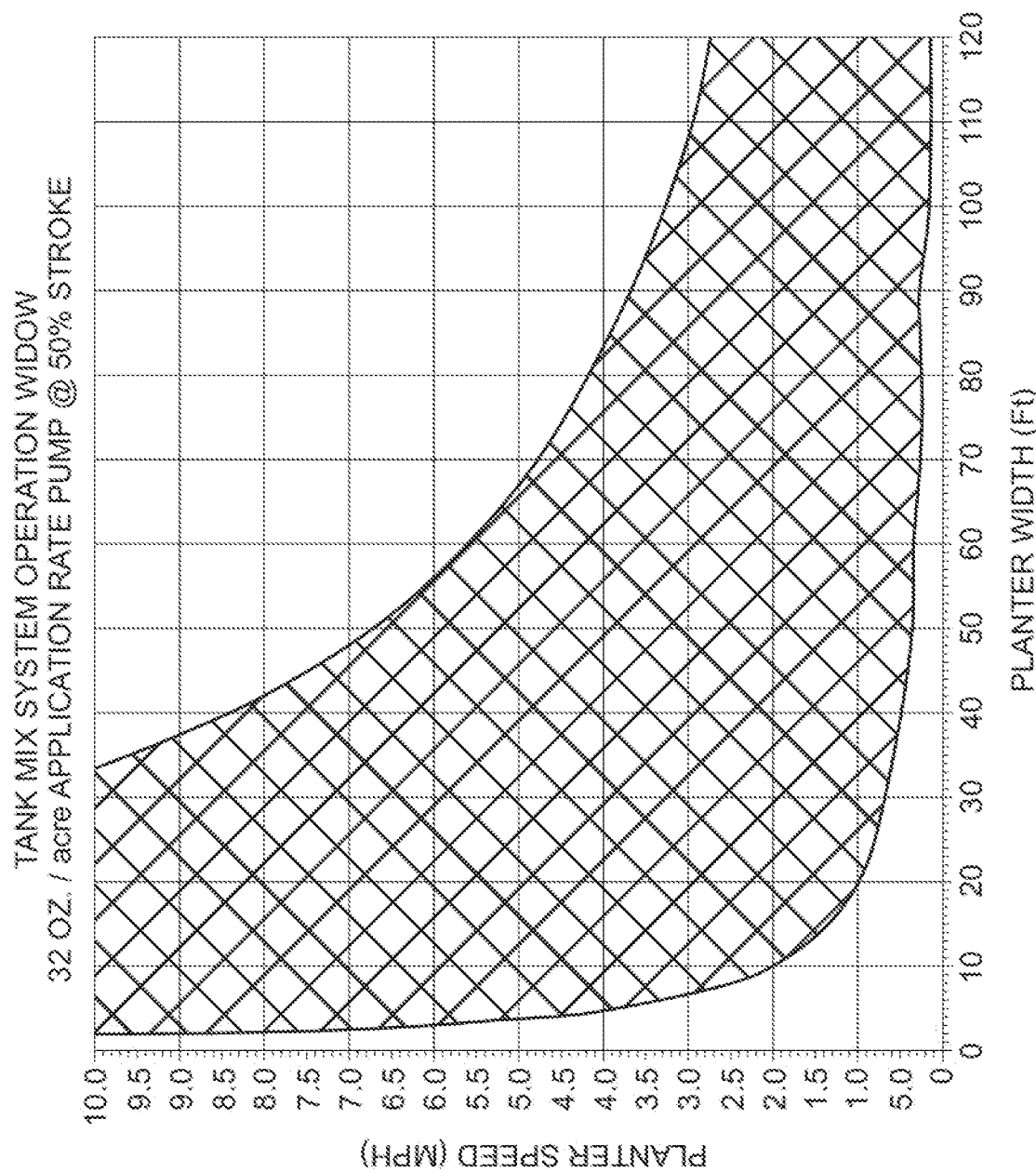

FIG. 9 depicts an exemplary monitoring unit 70. As shown, the monitoring unit 70 includes a housing 72 with an internal chamber 78 with an inlet 74 and an outlet 76. A contact 71 is provided at the bottom of the chamber 78 and a cartridge 79 is configured to move within the chamber 78. The cartridge 79 is configured such that when proper flow exists between the inlet 74 and the outlet 76, the cartridge 79 is suspended within the chamber 78 and spaced from the contact 71. If the flow is blocked or otherwise improper, the cartridge 79 drops and contacts the contact 71, thereby causing a signal indicating improper flow to be sent through wires 73 (or wirelessly) to the control module 12. Upon receipt of such a signal, the control module 12 can generate an alarm to alert an operator to check for blockages and/or a shut off signal to terminate the system operation.

The manifold 20 divides the fluid stream into four separate sub-streams 22a-d, with each sub-stream directed towards a respective foam mixing chamber 40. Manifold 20 houses a valve (e.g. solenoid) for each of the sub-streams 22a-d, which can operate independently of each other under the control of the control module 12. Accordingly, only select lines 22a-d can be operated at a given time. Likewise, a first line can be operated in a first mode (e.g. continuously) while a second line can be operated in a second mode (e.g. intermittingly).

A compressed air line 16 is also provided which includes one or more compressors 130, 132. From the compressor(s), the air line passes thru a relief valve 134 which allows the high pressure air that can buildup on the compressor diaphragm to be evacuated. The small diaphragm compressors that are being used will not start with high pressure on them, and to help with power consumption form the tractor or other mechanical planting equipment, the compressor(s) are started with only atmospheric pressure on them. From the relief valve 124, the high pressure air flows thru a pressure regulator 18, through a second valve manifold 30 and to a respective foam mixing chamber 40. Manifold 30 houses a valve (e.g. solenoid) for each of the sub-streams 32a-d, which can operate independently of each other under the control of the control module 12. Accordingly, only select lines 32a-d can be operated at a given time. Likewise, a first line can be operated in a first mode (e.g. continuously) while a second line can be operated in a second mode (e.g. intermittingly).

Figure 3:
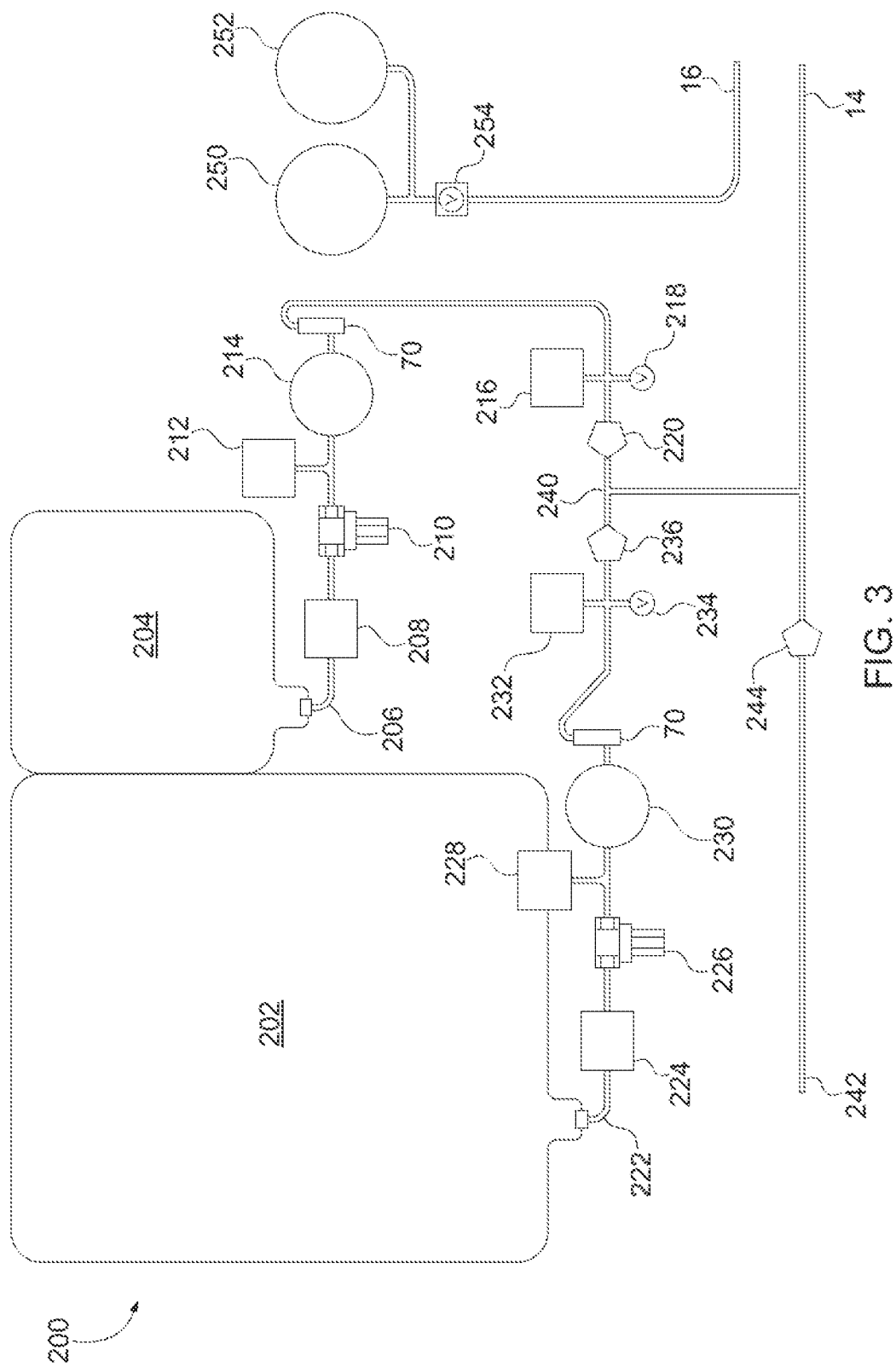
FIG. 3 is a schematic representation of an exemplary injection mixing system which may be utilized within the delivery system.

Prior to explaining the continued flow through the foam mixing chambers and beyond, another exemplary tank and pump assembly 200 in accordance with an embodiment of the invention will be described with reference to FIG. 3. In the tank and pump assembly 200, the chemical formulation and medium (e.g. water) are housed in separate containers, metered by separate systems and mixed in line and downstream of their respective containers ("injection mixing"). More specifically, the water is stored in a first tank 202 and the chemical is kept in a separate tank 202. While only one chemical tank is illustrated, it is contemplated that more than one chemical tank may be provided whereby the control module 12 may select a desired chemical for a specific application and/or may mix multiple chemicals to achieve the desired foamable formation.

The chemical stream exits the chemical tank 204 thru a line 206 and a hand controlled ball valve 208 into a strainer 210. The line 206 contains a tee that will allow for a vacuum switch 212 which will monitor the line to verify that there is chemical in the system and no blocks in the supply line. The vacuum switch 212 is preferably in communication with the control module 12, and if no chemical is detected, the control module 12 can generate an alarm to alert an operator to check for blockages, or a shut off signal to terminate the system operation. The chemical line then enters a metering pump 214. The pump 214 may be, for example, a 12-volt electric positive displacement pump that is rated for a maximum flow of 20 ounces per minute. The pump is monitored by the control module 12 for flow rate. For example, the control module 12 may monitor the pump's speed with a magnet wheel and a Hall Effect sensor. The speed of the pump 214 is adjusted by the control module 12 to maintain the desired rate based on ground speed, width and/or GPS derived prescription. The chemical stream then continues thru a monitoring unit 70, as described above, that monitors if the flow of chemical has been interrupted. The chemical line then continues on to a cross with an electronic pressure transducer 216 and a hydrostatic relief valve 218 to protect the pump 214. The chemical line then continues through a check valve 220 and on to a tee or mixing device 240.

The water stream exits the chemical tank 202 thru a line 222 and a hand controlled ball valve 224 into a strainer 226. The line contains a tee that will allow for a vacuum switch 228 which monitors the line to verify that there is water in the system and no blocks in the supply line. The vacuum switch 228 is preferably in communication with the control module 12, and if no water is detected, the control module 12 can generate an alarm to alert an operator to check for blockages, or a shut off signal to terminate the system operation. The water line then enters a metering pump 230. The pump 230 may be, for example, a 12-volt electric positive displacement pump that is rated for a maximum flow of 40 ounces per minute. The pump 230 is monitored by the control module 12 for flow rate. For example, the control module 12 may monitor the pump's speed with a magnet wheel and a Hall Effect sensor. The speed of the pump 230 is adjusted by the control module 12 to maintain the desired rate based on ground speed, width and/or GPS derived prescription. The water stream then continues thru a monitoring unit 70, as described above, that monitors if the flow of chemical has been interrupted. The water line then continues to a cross with an electronic pressure transducer 232 and a hydrostatic relief valve 234 to protect the pump 230. The water line then continues through a check valve 236 and on to the tee or mixing device 240. The now mixed solution of water and foamable formulation continues on to a valve manifold block 20 via the line 14 similar and continues therefrom as described with respect to the previous embodiment. A flush line 242 may be connected with the line 14 via a check valve 244.

Similar to the previous embodiment, a compressed air line 16 is also provided which includes one or more compressors 250, 252. From the compressor(s), the air line passes thru a relief valve 254 which allows the high pressure air that can buildup on the compressor diaphragm to be evacuated. The small diaphragm compressors that are being used will not start with high pressure on them, and to help with power consumption form the tractor or other mechanical planting equipment, the compressor(s) are started with only atmospheric pressure on them. From the relief valve 254, the high pressure air flows to the pressure regulator 18 and then continues in the manner described with respect to the previous embodiment.

Figure 5:
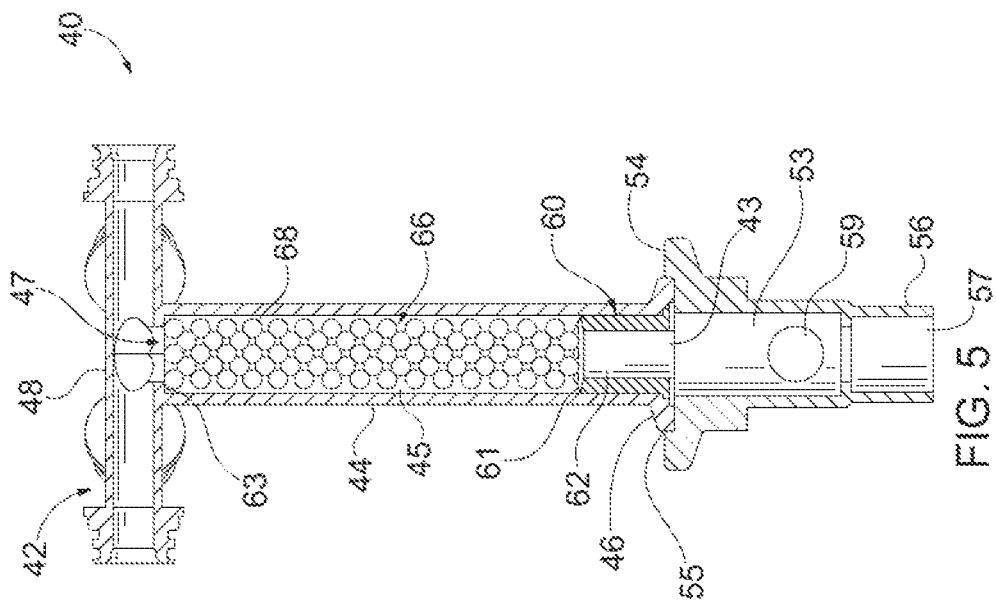
FIG. 5 is a cross-sectional view through the foam mixing chamber of FIG. 4.
Figure 4:
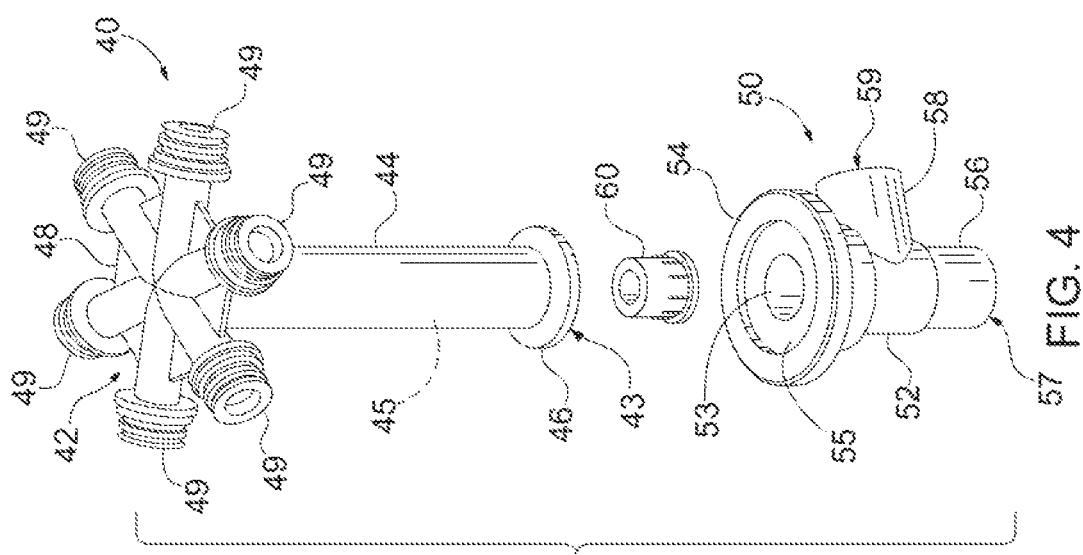
FIG. 4 is an exploded perspective view of an exemplary foam mixing chamber in accordance with an embodiment of the invention.

Referring again to FIGS. 1 and 2, flow through the delivery system 10 after the valve manifolds 20 and 30 will be described. The individual section lines 22a-d and 32a-d carry the liquid and air flows to a respective foam mixing chamber 40. In the foam mixing chamber 40, the air and fluid streams mix and create the desired high expansion foam. Referring to FIGS. 2 and 4-5, each foam mixing chamber 40 includes a chamber body 42 and a mixing tee 50. The chamber body 42 includes a tube 44 with a hollow interior chamber 45. The chamber 45 is communication with an inlet port 43 and a manifold head 48 via an internal passage 47. The manifold head 48 defines a plurality of outlet ports 49. In the illustrated embodiment, the manifold head 48 is provided with six outlet ports 49, however, more or fewer outlet ports 49 may be provided. Additionally, ports 49 which are not needed may be capped. In the illustrated embodiment, a flange 46 is provided about the inlet port 43 for connection with the mixing tee 50.

The mixing tee 50 includes a body 52 with a connection flange 54 extending about the tee outlet port 53. A seat 55 is provided to receive the flange 46 such that the tee outlet port 53 is in communication with the inlet port 43. In the illustrated embodiment, the flange 46 connects within the seat 55 with an interference fit. However, alternative coupling arrangements (e.g. threaded connection, tongue-and-grove mating, etc.) can be employed. Furthermore, in some embodiments the mixing tee 50 can be formed integrally with the chamber body 42 such that the assembly is a unitary component. The tee body 52 defines an air connection 56 with an inlet port 57 and a fluid connection 58 with an inlet port 59. Both ports 57 and 59 are in communication with the tee outlet port 53. Referring to FIG. 2, air coming from the air line 32a-d preferably passes through a check valve strainer 65 and an orifice plate 67 as it enters the port 59. The orifice plate 67 includes a through hole sized to permit passage of a desired air flow. Similarly, fluid coming from the fluid line 22 a-d passes through a check valve strainer 65, an orifice core 69 and an orifice plate 67. The orifice plate 67 again includes a through hole sized to permit passage of a desired fluid flow while the orifice core 69 engages the fluid flow and begins to agitate the foamable formulation.

Referring to FIG. 5, the interior chamber 45 houses a foaming medium 66 configured to agitate the foamable formulation as it passes through the chamber 45. In the illustrated embodiment, the foaming medium 66 includes a plurality of glass spheres 68 packed tightly within the chamber 45. The spheres 68 are chosen to have a size which provides a desired amount of surface contact area to achieve the desired foam expansion. As an example, the spheres 68 may have a diameter of 5-6 mm. Additionally, the length of the chamber 45 may similarly be selected to achieve a desired expansion. It is contemplated that other foaming mediums may be utilized, for example, steel wool, provided the medium provides a predictable rate of expansion. To maintain the foaming medium 66, an upper screen 63 is positioned over the internal passage 47 and a lower screen 61 is maintained by a locking plug 60 positioned in the inlet port 43. The locking plug 60 includes a through passage 62 to allow flow into the chamber 45. The locking plug 60 may have an interference fit, threaded fit or the like.

In operation, the mixture of chemical formulation and water (or "solution") enterers the foam mixing chamber 40 through the inlet port 59 on the mixing tee 50 and the compressed air stream enters the inlet port 59 of the mixing tee 50. The pressured air flow through the inlet port 59 drives the solution into the interior chamber 45 such that the solution passes through foaming medium 66 and foams. The foamed solution exits through the internal passage 47 into the manifold head 48 from which the foamed solution is distributed through the outlet ports 49. The foam mixing chamber 40 is preferably oriented in a vertical orientation with the outlet ports 49 above the inlet ports 57, 59. Such vertical orientation is believed to improve the foam quality and/or prevent the solution from pooling in the mixing chamber 45.

Figure 6:
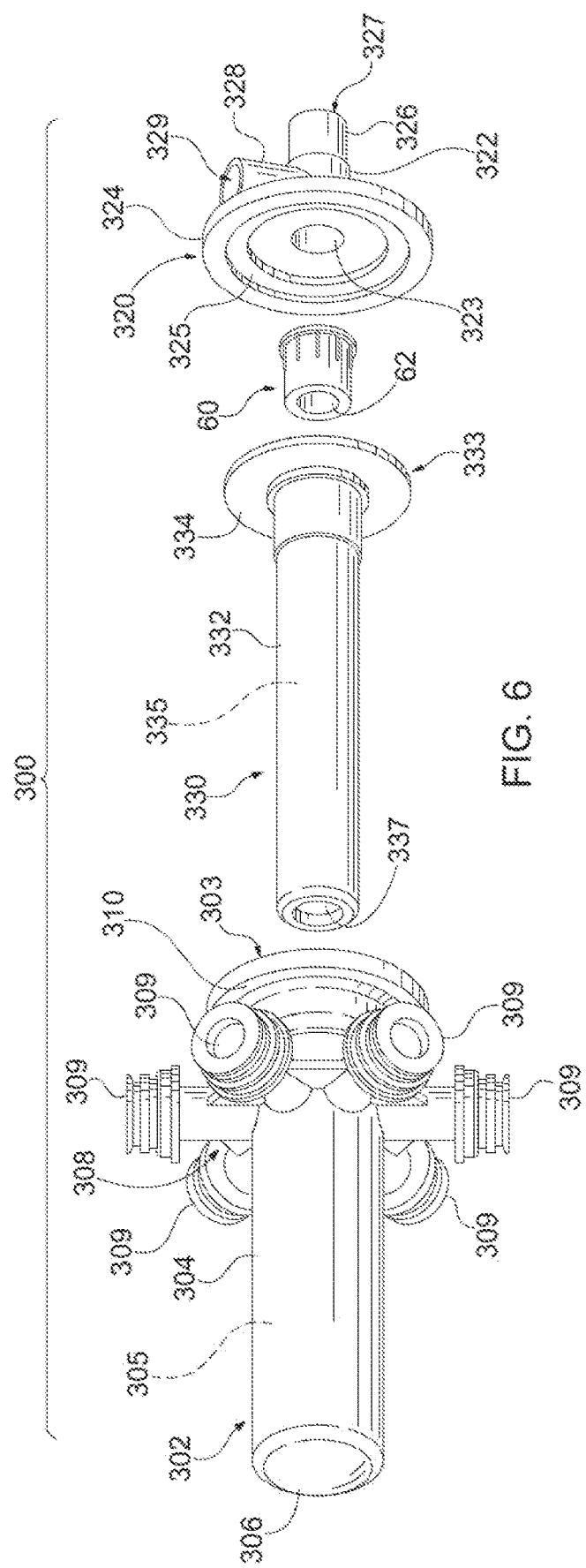
FIG. 6 is an exploded perspective view of another exemplary foam mixing chamber in accordance with an embodiment of the invention.
Figure 11:
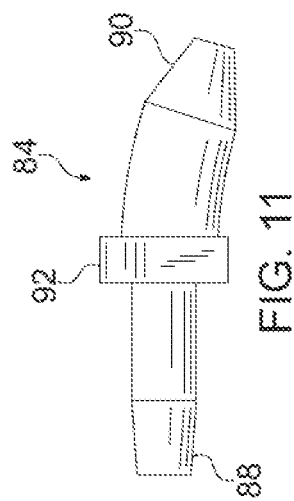
FIG. 11 is a side elevation view of the discharge nozzle of FIG. 10.
Figure 10:
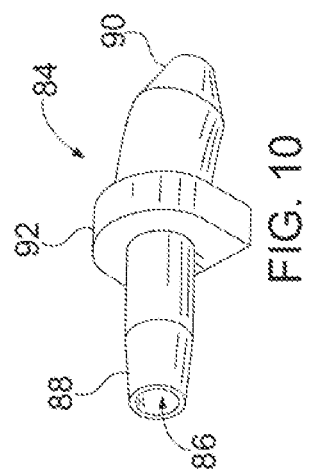
FIG. 10 is a perspective view of an exemplary discharge nozzle in accordance with an embodiment of the invention.
Figure 12:
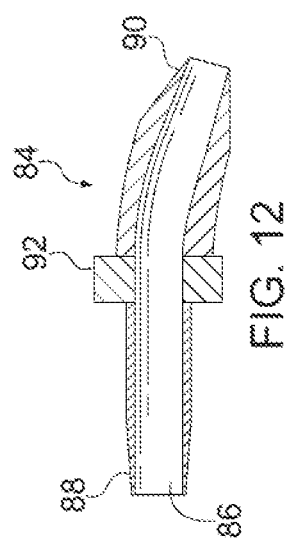
FIG. 12 is a cross-sectional view of the discharge nozzle of FIG. 10.

Referring to FIGS. 6-8, another exemplary foam mixing chamber 300 in accordance with the invention will be described. The foam mixing chamber 300 generally includes an outer housing member 300, a mixing tee 320 and an internal divider member 330. The outer housing member includes a tube 304 with a hollow interior chamber 305 extending between an open end 303 to a closed end 306. A manifold head 308 is provided proximate the open end 303 and defines a plurality of outlet ports 309 in communication with the interior chamber 305. In the illustrated embodiment, the manifold head 308 is provided with six outlet ports 309, however, more or fewer outlet ports 309 may be provided. Additionally, ports 309 which are not needed may be capped. In the illustrated embodiment, a flange 310 is provided about the open end 303 for connection with the mixing tee 320.

The mixing tee 320 is similar to the previous embodiment and includes a body 322 with a connection flange 324 extending about the tee outlet port 323. A seat 325 is provided to receive a flange 334 of the internal divider member 330 as described below. The tee body 322 defines an air connection 326 with an inlet port 327 and a fluid connection 328 with an inlet port 329. Both ports 327 and 329 are in communication with the tee outlet port 323. As in the previous embodiment, a check valve strainer 65, an orifice plate 67 and/or an orifice core 69 may be positioned in the ports 327, 329.

The internal divider member 330 includes a tubular body 332 defining an interior chamber 335 extending between an inlet port 333 and an outlet port 337. A flange 334 is provided about the inlet port 333 such that when it is seated in the seat 325 of the mixing tee 320, the inlet port 333 is aligned with the tee outlet port 323. Referring to FIG. 8, upon assembly, the interior divider member 330 defines a passage 311 between the outer housing member 302 and the interior divider member 330. The passage 311 communicates between the outlet port 337 and the outlet ports 309. The flange 334 seals with respect to the outer housing member 302 such that the tee outlet 323 is not in communication with the passage 311, an instead flow from the mixing tee 320 flows through the plug passage 62 and into the interior chamber 335 as indicated by arrow A. The interior chamber 335 contains a mixing medium 66, for example glass spheres 68, similar to the previous embodiment. The incoming solution flows through the foaming medium 66 and the foam flows out of the outlet 337. The foam is redirected by the closed end 306 to flow through the passage 311 to the outlet ports 309, as indicated by the arrows B and C. The manifold head 308 distributes the foam to flow out of the outlet ports 309 as indicated by arrow D.

Either foam mixing chamber 40, 300 configuration can be employed in the "tank mixing" or "injection mixing" configurations. Furthermore, some applications can employ a combination of the two configurations. Both foaming chamber configurations are advantageous in that they provide for forming of a foam internally, i.e., without exposure to ambient conditions such as wind or excess water which may undesirably dilute the chemical formulation. Moreover, forming the foam at a location upstream from the dispensing nozzles, as disclosed herein, is beneficial in that it can provide additional dwell time for the formulation to mix or dissolve within the water. This additional dwell time provides a more consistent mixture and for a "fully developed" hydrodynamic flow profile to be established within conduit leading to the dispensing nozzles.

Figure 2:
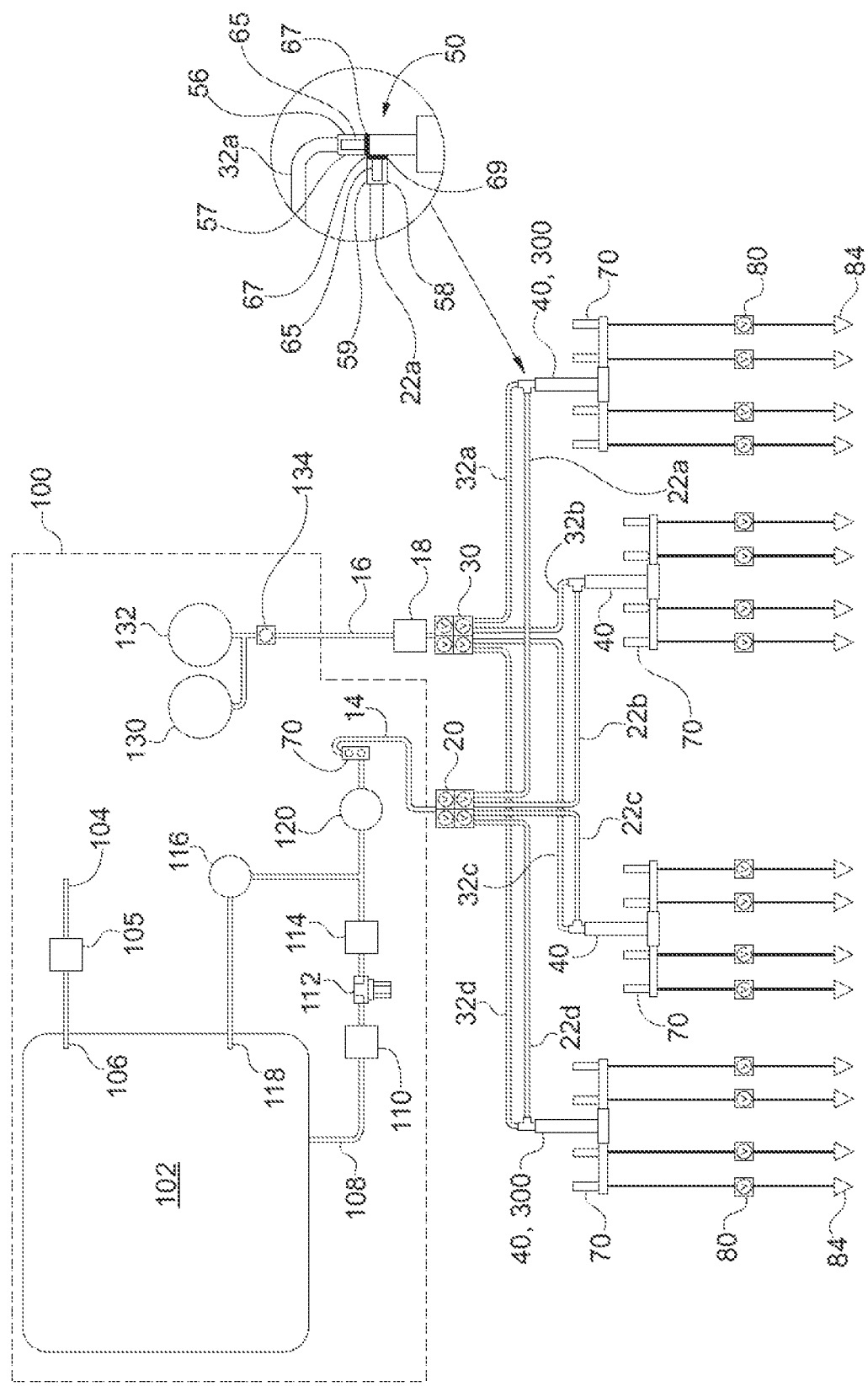
FIG. 2 is a schematic representation of an exemplary tank mixing system in conjunction with a delivery system in accordance with an embodiment of the invention.

Referring to FIGS. 1 and 2, the foam stream exiting the foam mixing chamber 40, 300 is directed to a respective nozzle 84 for direct delivery within a respective planting furrow. A monitoring unit 70 and a control valve 80 are positioned along each specific line. The monitoring unit 70, as described above, is configured to monitor if a sufficient foam flow is passing therethrough. If the control module 12 receives a signal indicating that foam flow is not sufficient, the control module 12 can generate an alarm to alert an operator to check for blockages and/or a shut off signal to terminate the system operation. The control valves 80 are controlled by the control module 12 and can be control to close the row line to stop the stream of foam when the planter is, for example, stopped or turning. Additionally, the system can be configured such that the valve 80 is controlled for intermittent application of the foam. For example, the foam may be applied only directly to each seed and the flow stopped during the travel between seeds.

Referring to FIGS. 10-12, an exemplary dispensing nozzle 84 in accordance with an embodiment of the invention will be described. Each nozzle 84 includes an internal passage 86 extending from a proximate end 88 to a distal end 90. The proximate end 88 is configured with a diameter which allows the proximate end 88 to be readily inserted within the foaming line. The proximate end 92 can also be tapered or pointed to further ease the insertion of the nozzle into the foaming line. The nozzle 84 includes a flange 92 disposed between the two ends of the nozzle which serves as a stop member to prevent over-insertion of the nozzle within the foaming line.

The distal end 90 of the nozzle 84 acts as the dispensing orifice. The distal end 90 may include a sharp degree of taper which is beneficial in that in facilitates dispensing or release of the foam in the form of a rope, as compared to blunt nozzle discharge orifices wherein the foam often clings to the nozzle and expands or grows to the size of that blunt end. An additional benefit of the tapered dispensing end 90 is that it does not reduce foam discharge velocity (as blunt orifices are known to do) and in some instances can serve to accelerate the velocity of the foam being dispensed, thereby providing a more continuous discharge foam rope within a furrow, particularly when the planter is traveling at high speeds.

In operation, the foam dispensing system described herein can be incorporated into a seed planting device such that the seed and foam are dispensed simultaneously. In such applications, the foam discharge nozzle can be located to dispense foam either in front of the seed tube or behind the seed tube depending on customer practices and preferences. In some applications it is beneficial to dispense the foam after the seed has been ejected from the planter so that the seed is ensured to make sufficient contact with the soil. In accordance with an aspect of the disclosure, the foaming discharge rate can be adjusted as needed in applications in which the foam is dispensed in advance of the seed to ensure that the proper amount of foam is deposited in the furrow so as to avoid over saturating or filling the furrow and "floating" the seed such that there is too little contact with the soil. Additionally, in some embodiments, the nozzle or dispensing orifice can be configured to articulate so as to provide a non-linear (e.g. zig-zag) rope of foam into the furrow. Furthermore, the valves within the lines can be operated independently to control the flow of water, air and/or chemical formulation to discharge foam on a continuous or intermittent basis, as so desired.

In other embodiments not requiring foamable formulations, the apparatus and systems do not need to contain the compressed air lines or sources of compressed air or other gases required to produce a foam.

Flow Ranges

The apparatus and methods disclosed herein provide an optimal system that is capable of operating over a range of speeds, while minimizing the volume of chemical formulation employed. For purpose of illustration and not limitation, some exemplary ranges include approximately 4-16 ounces of chemical formulation per acre, and 24-64 ounces of water per acre with a planter having a ground speed ranging from 2-7 miles per hour.

FIGS. 13-17 depict graphical representations of exemplary speeds and plantar width ranges of the delivery system 10 when using, for example, a 12-volt electric positive displacement pump. Other results may be achieved utilizing other equipment. The graphs represent the significant flexibility of the delivery system 10 by controlling the various components via the control module 12. With such flexibility, it is not necessary for the user to reconfigure the system each time operating conditions are varied.

Field Testing

In order to evaluate the foam formulations of the present invention within the presently described system, formulation containing bifenthrin were tested for assessing their ability to control Corn Rootworm feeding. As such, field trials were conducted in several locations across the Midwestern United States to evaluate the efficacy of Example 2 foam formulation insecticide compared to CAPTURE® LFR® Insecticide against Corn Rootworm (*Diabrotica* spp.)

The objective of these trials was to determine if the efficacy of Example 2 formulation is equal or better than the currently marketed by FMC Corporation, CAPTURE® LFR® Insecticide which is a formulation that also contains bifenthrin as active ingredient; and a commercial Corn Rootworm standard treatment using FORCE® 3G, which contains tefluthrin insecticide distributed by AMVAC.

Test plots were prepared by preparing the test fields for planting followed by planting field corn and treating the planted furrows with either CAPTURE® LFR® insecticide, FORCE® 3G insecticide or foam created using the formulation of Example 2 prior to covering the furrow. Untreated control test plots were also included. The data collected from five locations in the Midwest including Coleman, S. Dak., Concord, Nebr., Wyoming, Ill., Clay Center, Nebr. and Nashua, Iowa shown in the following Table A.

As evident, those of ordinary skill in the art can appreciate that the Example 2 formulation of the present invention had significantly lower corn rootworm feeding damage than the untreated. The Example 2 formulation further exhibited equal to or better than control of corn rootworm feeding than that of CAPTURE®LFR® and FORCE® 3G. The level of feeding damage prevention was statistically equal to the comparative formulations (P<0.10, Duncan's New MRT).

TABLE A

Evaluation of Corn Rootworm management

| | Mean Corn Rootworm Root Rating by Location[1,2] | | | | |
|---|---|---|---|---|---|
| Treatment | Coleman | Concord | Wyoming, IL | Clay Center | Nashua |
| Untreated | 0.45 a | 0.42 a | 1.73 a | 0.81 a | 1.69 a |
| CAPTURE ® LFR ® 0.1 lb ai/A + 8-24-0 liquid fertilizer Applied at 5 gal/A | 0.05 b | 0.19 bc | 0.98 b | 0.35 c | 0.73 b |
| Example 2; 0.1 lb ai/A in 48 oz total liquid volume per acre | 0.04 b | 0.2 bc | 0.76 bc | 0.47 bc | 0.95 b |
| Example 2; 0.1 lb ai/A in 32 oz total liquid volume per acre | NA | NA | 0.46 cd | 0.42 bc | NA |
| FORCE ® 3G 0.15 lb ai/A | 0.05 b | 0.09 c | 0.24 d | 0.49 bc | 1 b |

[1]Root ratings ISU 0-3 scale.
[2]Means followed by the same letter do not significantly differ (P = 0.10, Duncan's New MRT); data transformed arcsine square root percent for analysis with original means displayed These results indicate that Example 2 formulation of bifenthrin applied at low total volume rates per acre (48 oz. and 32 oz./acre) provide corn rootworm feeding damage protection that is statistically equal to or better than CAPTURE® LFR® applied at 5 gallons/acre of liquid fertilizer and statistically equal to FORCE® 3G.

The exemplary ranges and dimensions are provided herein merely for purposes of illustration and not limitation. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. For example in one embodiment, one of ordinary skill in the art can broaden the zone of protection in comparison to what could have been achieved with standard liquid applications. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A method for in situ treatment of a seed being planted in a furrow, comprising:
    directly applying a foamed liquid agricultural formulation onto a seed as it is being dropped into the soil in a furrow, in an amount sufficient to provide at least one crop benefit effect to the seed during planting,
    wherein said foamed liquid agricultural formulation comprises:
        at least one agriculturally active ingredient wherein the at least one agriculturally active ingredient comprises bifenthrin and *Bacillus* sp. D747;
        a foaming agent selected from the group consisting of sodium dodecylbenzene sulfonate, sodium $C_{14-16}$ olefin sulfonate, lauramine oxide, decylamine oxide, ammonium laureth sulfate, sodium trideceth sulfate, sodium decyl sulfate, and mixtures of two or more thereof in a total of about 0.1% to about 50% by weight based on the total liquid formulation;
        a foam stabilizer selected from the group consisting of glycerine, carrageenan, xanthan gum, guar gum, gum Arabic, gum tragacanth, poly(ethylene oxide), alginin, sodium alginate, and mixtures of two or more thereof in a total of about 0.1% to about 15% by weight based on the total liquid agricultural formulation; and
        from 0% to about 45% by weight of water, based on the total weight of the liquid agricultural formulation;
        wherein the liquid agricultural formulation has a viscosity ranging from 3 cps to 10,000 cps.

2. The method of claim 1 further comprising a step of covering the treated seed with soil after being dropped into said furrow, in the same operation.

3. The method of claim 1, wherein the liquid agricultural formulation is an aqueous composition in the form of a microemulsion, an oil-in-water concentrated emulsion, a suspension, a suspension concentrate, an emulsifiable concentrate, or a microencapsulate that further comprises one or more additives selected from the group consisting of stabilizers, surfactants, wetting agents, preservatives, adjuvants, biocides and lubricants.

4. The method of claim 1, wherein the foamed liquid agricultural formulation is applied at an effective rate of about 0.3 to about 1 gallon of unfoamed formulation/acre or less.

5. The method of claim 1, wherein said liquid agricultural formulation further comprises a phosphate ester salt.

6. The method of claim 1, wherein the treatment of said seed is on the fly.

7. The method of claim 1, wherein the liquid agricultural formulation further comprises at least one preservative.

8. The method of claim 7, wherein said preservative comprises sodium benzoate, potassium sorbate, or mixtures thereof.

9. A method for in situ treatment of a seed being planted in a furrow, comprising the steps of:
   directly applying a foamed liquid agricultural formulation onto a seed as it is being dropped into the soil in a furrow, in an amount sufficient to provide at least one crop benefit effect to the seed during planting,
   wherein the foamed liquid agricultural formulation comprises:
   a) bifenthrin and *Bacillus* sp. D747;
   b) alkyl polyglucoside;
   c) phosphate ester salt;
   d) sodium decyl sulfate;
   e) glycerine;
   f) xanthan gum;
   g) water;
   h) sodium benzoate and potassium sorbate;
   i) optionally, ammonium sulfate;
   j) optionally, attapulgite; and
   k) optionally, acetic acid;
   wherein the liquid agricultural formulation has a viscosity ranging from 3 cps to 10,000 cps.

10. The method of claim 1, wherein the liquid agricultural formulation further comprises a gas to produce the foamed agricultural formulation.

11. The method of claim 9, wherein the liquid agricultural formulation further comprises a gas to produce the foamed agricultural formulation.

12. The method of claim 1, wherein the foaming agent is present in the formulation in an amount from 5% to 25% by weight of the formulation.

* * * * *